United States Patent
Chew

(10) Patent No.: US 10,819,566 B2
(45) Date of Patent: Oct. 27, 2020

(54) EDGE OR FOG GATEWAY ASSISTED IDE REDIRECTION FOR FAILOVER REMOTE MANAGEMENT APPLICATIONS

(71) Applicant: Intel Corporation, Santa Clara, CA (US)

(72) Inventor: Yen Hsiang Chew, Penang (MY)

(73) Assignee: Intel Corporation, Santa Clara, CA (US)

(*) Notice: Subject to any disclaimer, the term of this patent is extended or adjusted under 35 U.S.C. 154(b) by 114 days.

(21) Appl. No.: 16/020,540

(22) Filed: Jun. 27, 2018

(65) Prior Publication Data
US 2019/0044794 A1 Feb. 7, 2019

(51) Int. Cl.
H04L 12/24 (2006.01)
H04L 29/08 (2006.01)
H04L 29/12 (2006.01)
H04L 29/14 (2006.01)

(52) U.S. Cl.
CPC ...... *H04L 41/0672* (2013.01); *H04L 41/0677* (2013.01); *H04L 61/2015* (2013.01); *H04L 67/1097* (2013.01); *H04L 67/34* (2013.01); *H04L 69/40* (2013.01)

(58) Field of Classification Search
None
See application file for complete search history.

(56) References Cited

U.S. PATENT DOCUMENTS

| 2005/0289218 A1* | 12/2005 | Rothman | G06F 3/0664 709/203 |
| 2006/0149860 A1* | 7/2006 | Diamant | G06F 13/102 710/15 |

* cited by examiner

*Primary Examiner* — Shripal K Khajuria
(74) *Attorney, Agent, or Firm* — Schwabe, Williamson & Wyatt, P.C.

(57) ABSTRACT

Technologies to provide a gateway-assisted out-of-band (OOB) remote management session between a remote management service (RMS) and a managed client system are provided. In response to a fault being detected at a client computer system, a RMS receives a client initiated remote access (CIRA) packet from the client system. The CIRA packet includes client configuration information and a single hop network appliance identifier (SHNAI) associated with a network appliance that is a single hop away from the client system. The RMS inspects the SHNAI and the client configuration information, and identifies and copies suitable application(s) from a storage system to a local storage of the gateway indicated by the SHNAI. The RMS instructs/controls the client system to perform an IDE redirection to the gateway in order to provision the application(s) from the local storage of the gateway. Other embodiments may be described and/or claimed.

26 Claims, 11 Drawing Sheets

US 10,819,566 B2

EDGE OR FOG GATEWAY ASSISTED IDE REDIRECTION FOR FAILOVER REMOTE MANAGEMENT APPLICATIONS

FIELD

Embodiments of the present disclosure generally relate to the field of computing systems and devices, and more particularly to out-of-band remote management of client systems.

BACKGROUND

When a client computing device is down (e.g. hard disk crash), out-of-band (OOB) remote management of the client computing device may be performed through a remote management console, and a management controller that is co-located with the computing environment of the client computing device. When a client computing device is down, the management controller may initiate a help request to the remote management console, via e.g., a client initiated remote access (CIRA) packet. In response, the remote management console may initiate an OOB management session, such as for example, a keyboard, video, and/or mouse (KVM) session with the client computing device (typically through the management controller) to remotely diagnose and fix the faulty client computing device. The management session between the client computing device and the remote management console may often occur via a wide area network (WAN) communication channel with multiple network hops.

The management controller co-located with the main computing environment of the client computing device may direct the client computing device to redirect its display output video stream to the remote management console via a network (e.g., the WAN). A management session between the client computing device and the remote management console may be communicated through a WAN communication channel with multiple network hops. Among other issues, this approach may result in sending an uncompressed video stream through a network, which may consume significant bandwidth. In some cases, excessive WAN network latencies or a temporary disruption in network bandwidth may distort KVM video quality or cause the KVM session to terminate prematurely. Additionally, KVM keyboard and mouse inputs from a remote management console including input/output (IO) redirection features (e.g. USB or boot disk redirection) may also be subject to the above network bandwidth constraints of a WAN.

Furthermore, during a recovery process, a client computing device may not be usable and may continuously display a blank screen or a debug screen until it is fixed; in addition, repair of a client computing device may take some time to accomplish. If a client computing device (e.g. digital signage, kiosk . . . ) is deployed in a public place (e.g. shopping complex, airport, street corner . . . ), having a blank screen during diagnostic and repair may not be aesthetically appealing to viewers and/or end users. The blank screen may also cause disruption in commerce (e.g., flight information not available, unable to place an order through a kiosk, and the like). In some cases, a client computing device will remain non-functional until it is fixed onsite (e.g., as might be required for a faulty hard disk or memory replacement).

BRIEF DESCRIPTION OF THE DRAWINGS

Embodiments of the remote management devices and methods of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 3A shows a process for providing an IDE redirection, according to various embodiments; FIG. 3B shows a process for remote management of a client system as performed by a single hop network appliance, according to various embodiments; FIG. 3C shows a process for remote management of a client system as performed by a computer system that provides a remote management service, according to various embodiments; and FIG. 3D shows a process for remote management of a client system as performed by the client system, according to various embodiments.

DETAILED DESCRIPTION

Figure 1:
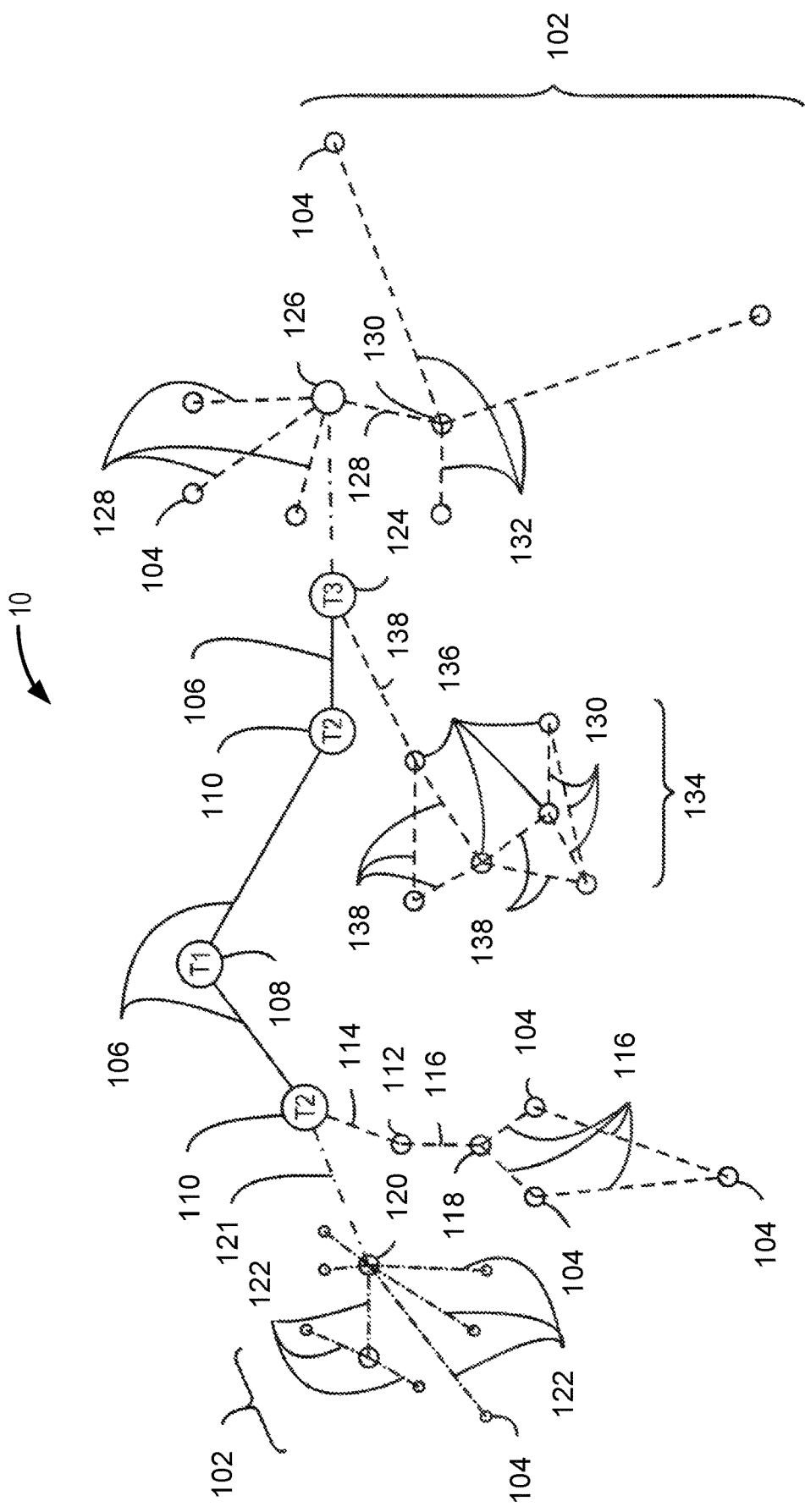
FIG. 1 illustrates an arrangement showing interconnections that may be present between the Internet and IoT networks, in accordance with various embodiments.

Embodiments of the present disclosure describe devices, systems, and techniques to provide remote management services for managed client computer systems ("client device" or "client system"). When a client computing system encounters an error or failure (e.g., a hard disk crash, memory failure, etc.), a management controller of the client computing system may initiate a client initiated remote access (CIRA) to a remote management console. The remote management console may initiate an IDE redirection to redirect the client computing system to boot from a remote bootable disk partition (e.g., an OS image or the like). IDE redirection lacks the quality of booting from a local disk partition due to the need to communicate with the remote disk partition through a network connection. For example, the IDE redirection may fail due to network-related latencies (e.g., low or poor data rates) or a failed network connection. These network disruptions may cause the remote boot procedure to terminate prematurely or otherwise fail Conventional IDE redirections require a faulty client to boot from a remote bootable disk partition that is stored in a remote storage system (e.g., a network attached storage (NAS)). However, the aforementioned issue may still arise when the client computer system is multiple hops (nodes) away from the remote storage system. Due to the network/bandwidth related limitations, it is not feasible to use IDE redirection for mainstream operating systems (e.g., Windows®, iOS®, Android®, Linux®, or some other operating system (OS) with virtual memory management).

Embodiments include techniques to provide a network appliance-assisted out-of-band (OOB) remote management session between a remote management service (RMS) and a managed client computer system. In response to a fault being detected at a client computer system, a RMS is to receive a client initiated remote access (CIRA) packet from the client computer system. The CIRA packet includes client configuration information and an identifier associated with an edge/Fog network appliance device that is a single (i.e., one) hop away from the client computer system. This identifier may be referred to as a "single hop network appliance identifier" or "SHNAI." The RMS is to inspect the SHNAI and the client configuration information, and is to invoke a failover module to identify and copy a suitable OS bootable disk partition and/or software application from a NAS to a local storage of the edge/Fog network appliance indicated by the SHNAI. The RMS also invokes the failover module to perform the IDE redirection to the edge/Fog network appliance in order to boot the OS from the local storage of the edge/Fog network appliance.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations. The description may use perspective-based descriptions such as top/bottom, in/out, over/under, and the like. Such descriptions are merely used to facilitate the discussion and are not intended to restrict the application of embodiments described herein to any particular orientation.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The phrases "in various embodiments," "in some embodiments," and the like are used repeatedly. These phrases generally do not refer to the same embodiments; however, they may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

The following description provides various examples of a remote management service that is to remotely manage a client computer system using a single hop network appliance, where the client computer system is a user device (e.g., desktop computer, laptop computer, smartphone, tablet computer, etc.) or an Internet of Things (IoT) device. However, some or all of these aspects may be applicable to scenarios where the managed client computer systems are server computer systems (e.g., in a datacenter or data warehouse) that are remotely monitored and repaired using in-band or out-of-band channels.

FIG. 1 illustrates an arrangement 10 showing interconnections that may be present between the Internet 100 and Internet of Things (IoT) networks, in accordance with various embodiments. The interconnections may couple smaller networks 102, down to the individual IoT device 104, to the fiber backbone 106 of the Internet 100. To simplify the drawing, not every device 104, or other object, is labeled. According to various embodiments, the IoT devices 104 are managed by a remote management service and are to implement the IDE redirection mechanisms discussed herein.

The internet of things (IoT) is a concept in which a large number of computing devices are interconnected to each other and to the Internet 100 to provide functionality and data acquisition at very low levels. The IoT devices 104 may be semiautonomous devices that perform a function, such as sensing or control, among others, in communication with other IoT devices 104 and a wider network, such as the Internet 100. Often, IoT devices 104 are limited in memory, size, or functionality, allowing larger numbers to be deployed for a similar cost to smaller numbers of larger devices. However, an IoT device 104 may be a smart phone, laptop, tablet, or PC, or other larger device. Further, an IoT device 104 may be a virtual device, such as an application on a smart phone or other computing device. IoT devices 104 may include network appliances such as IoT gateways, used to couple IoT devices 104 to other IoT devices 104 and to cloud applications, for data storage, process control, and the like.

Networks of IoT devices 104 may include commercial and home automation devices, such as water distribution systems, electric power distribution systems, pipeline control systems, plant control systems, light switches, thermostats, locks, cameras, alarms, motion sensors, and the like. The IoT devices 104 may be accessible through remote computers, servers, and other systems, for example, to control systems or access data. The IoT devices 104 may be any object, device, sensor, or "thing" that is embedded with hardware and/or software components that enable the object, device, sensor, or "thing" to capture and/or record data associated with an event, and communicate (e.g., transmit and receive) such data with one or more other devices over a network with little or no user intervention. For example, one or more of the IoT devices 104 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In another example, one or more of the IoT devices 104 may be biotic devices such as monitoring implants, biosensors, biochips, and the like. An IoT device 104 may also be a computer device that is embedded in a computer system and coupled with communications circuitry of the computer system. For example, the embedded computer device may be a system on chip (SoC), a universal integrated circuitry card (UICC), an embedded UICC (eUICC), and the like, and the computer system may be a mobile station (e.g., a smartphone) or user equipment (UE), laptop PC, wearable device (e.g., a smart watch, fitness tracker, etc.), "smart" appliance (e.g., a television, refrigerator, a security system, etc.), and the like.

The future growth of the Internet may include very large numbers of IoT devices 104. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices 104 and networks present a number of new challenges in a heterogeneous network of connectivity comprising a combination of wired and wireless technologies as depicted and discussed herein.

In FIG. 1, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE or NR cellular network, for example, by further fiber links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116. In another example, a high-speed uplink 121 may couple a tier 2 provider 110 to a gateway (GW) 120. A number of IoT devices 104 may communicate with the GW 120, and with each other through the GW 120, for example, over BLE links 122.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate GW 126 and other customers. From the corporate GW 126, a wireless local area network (WLAN) can be used to communicate with IoT devices 104 through Wi-Fi® links 128. A Wi-Fi link 128 may also be used to couple to a low power wide area (LPWA) GW 130, which can communicate with IoT devices 104 over LPWA links 132, for example, compatible with the LoRaWan specification promulgated by the LoRa alliance.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 2:
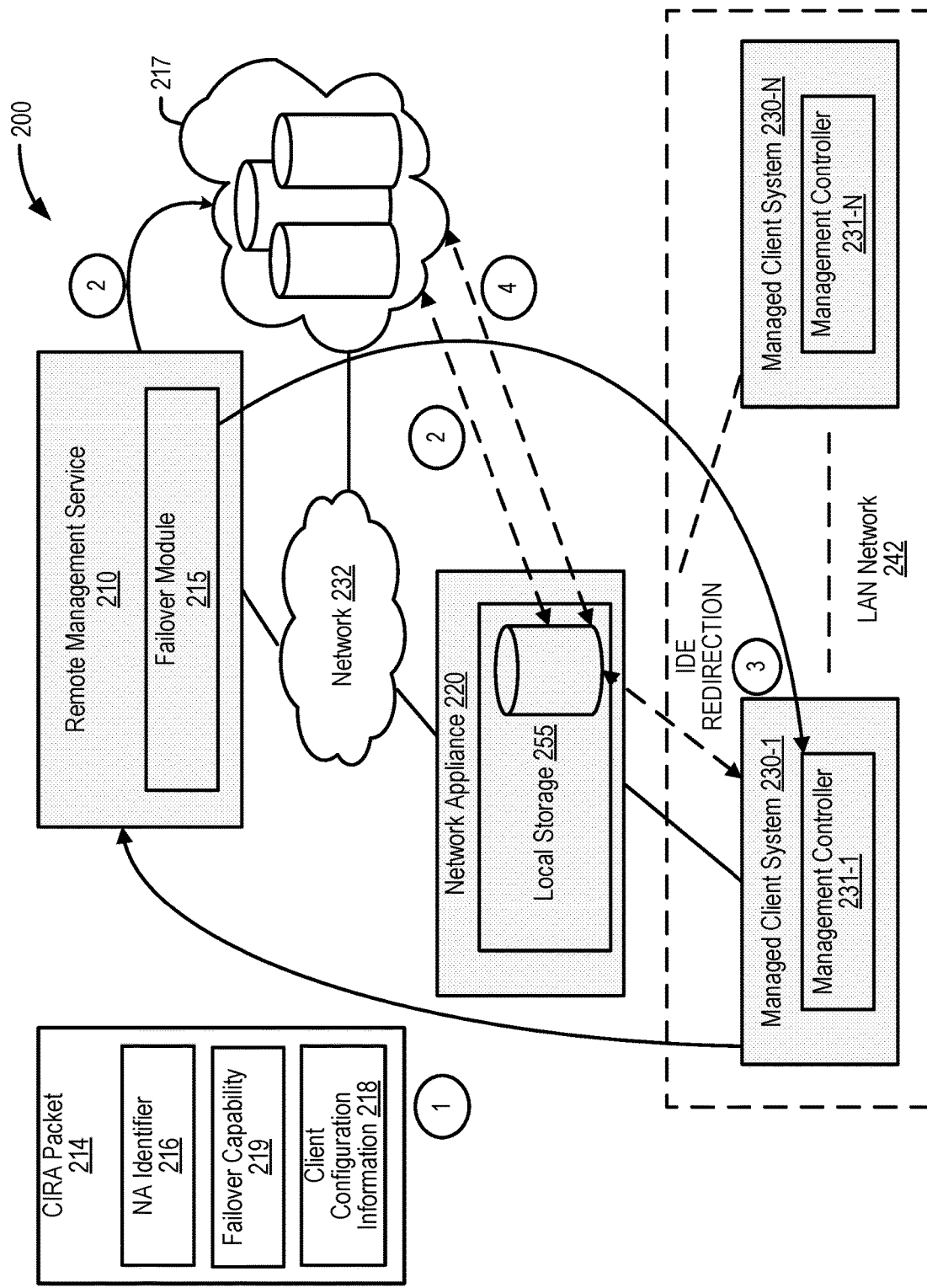
FIG. 2 illustrates a computing environment that implements a single-hop network appliance-assisted failover for managed client systems, according to various embodiments.

FIG. 2 illustrates a block diagram of a computing environment 200 that may implement a single-hop network appliance-assisted failover for managed client systems 230-1 to 230-N, according to various embodiments. In the illustrated embodiment, computing environment 200 includes a remote management service (RMS) 210 and a cloud storage system 217 communicatively coupled to a network appliance (NA) 220 in a network 232.

The RMS 210 is a set of management and security services that allow systems administrators to monitor, maintain, secure, and service client computer systems 230-1 to 230-N (collectively referred to as "client computer systems 230," "client computer system 230," "client system 230," or the like). The RMS 210 interacts with components of the client systems 230 (e.g., respective management controllers 231-1 to 231-N) for remote out-of-band management of the client systems 230 in order to monitor, maintain, update, upgrade, and repair the client systems 230. The RMS 210 may be implemented in or by one or more remote management servers, or the RMS 210 may be hosted by a cloud computing service. Examples of RMS 210 may include MeshCentral, Desktop and mobile Architecture Hardware (DASH), Distributed Management Task Force (DMTF), Intelligent Platform Management Interface (IPMI), Intel® Active Management Technology (AMT)®, The RMS 210 includes failover module 215, which invokes the management controller 231 of a faulty client system 230 to perform an IDE redirection to boot or otherwise provision the faulty client system 230 with one or more applications (e.g., operating system (OS) and/or other applications) from the local storage 255 of a single hop network appliance 220 through a network connection or link. In one example, the network connection may be a local area network (LAN) connection, such as a direct Ethernet connection between the client system 230 and the network appliance 220. In another example, the network connection between the client system 230 and the single hop network appliance 220 may be a wireless radio link, such as a wireless LAN (WLAN) link, a cellular network link, a personal area network (PAN) link, or the like. The failover module 215 provides an automatic failover mechanism using existing IDE redirection capabilities of the RMS 210, which is a feature desirable for IT organizations to remotely manage multiple edge or fog embedded devices (e.g., client systems 230).

"IDE" in "IDE redirection" refers to "Integrated Device Electronics," which is a type of hard drive ("IDE hard drive") that Serial ATA (SATA) hard drives. IDE hard drives were typically connected to a client computing system 230 using Parallel ATA, which preceded the use of SATA. The term "IDE redirection" refers to a built-in capability of the RMS 210 that enables system administrators to boot a client system 230 from an OS image that is stored in the network or in a remote location (e.g., cloud storage system 217), instead of booting from a local hard drive or removable storage device that is physically attached or coupled to the client system 230. Although the term "IDE" may refer to a particular hardware storage device, the terms "IDE redirection" or "IDE redirect" may refer to remote provisioning of operating systems or other applications with respect to any type of remote or attached hardware storage device or storage system.

The RMS 210 is also communicatively coupled with the storage system 217. The storage system 217 is a group of storage appliances comprising one or more data storage devicesimplementing a suitable network file sharing protocol or other like protocol(s) to provide data storage capabilities (e.g., access, retrieval, querying, etc.) to various computing devices. In various embodiments, the storage system 217 stores various applications to be provisioned in one or more faulty client systems 230. These applications may include one or more operating system (OS) images (e.g., boot images), one or more user applications (e.g., media players, web browsers, enterprise-specific tools, and the like), one or more platform-specific applications (e.g., an event capture and reporting application for an automated sensor or IoT device, a digital signage application for a kiosk or vending machine, applications for operating networked appliances, airline/flight monitoring applications for an airport flight information display application, and/or the like), or the like. Examples of the storage system 217 may include network attached storage (NAS) systems, storage area network (SAN) systems, cloud storage systems, a file hosting service, or some other suitable storage mechanism.

The network appliance 220 is a network element configured to provide communication services to client systems 230 by, for example, coordinating communications among client systems 230 within the environment 200 and communicating data to/from the RMS 210 via network 232 on behalf of the managed client systems 230. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The term "network appliance" refers to a network element that functionally participates in any level of exemplary networks that are disclosed herein. In some implementations, the network appliance 220 may act as a centralized hub and/or scheduler for the various devices within the environment 200 and/or act as a single point of contact between devices that are unable to directly connect to larger networks (e.g., network 232) and remote systems.

In some embodiments, the network appliance 220 comprises wireless communication circuitry and employs multi-radio frequency network technology to wirelessly communicate with the managed client systems 230 and/or may comprise network interface circuitry (e.g. an Ethernet port of the network appliance 220) to communicate with one or more managed client systems 230 via a wired connection. The network appliance 220 includes local storage circuitry 255, which is used to store one or more applications and/or operating systems (e.g., an OS partition or boot image). As discussed in more detail infra, the network appliance 220 also enables the one or more applications and/or operating systems stored in the local storage circuitry 255 to be accessed by, or otherwise provisioned into, downstream client systems 230 through a network interface of the network appliance 220. In some embodiments, network appliance 220 may include one or more virtual machines (VMs) or application containers (e.g., Docker® containers) to assist in provisioning the one or more applications or operating systems to corresponding managed client systems 230.

In various embodiments, the network appliance may be a gateway (GW) device (e.g., a network node equipped for interfacing with another network that uses a same or different communication protocols), including GWs 120, 126, and 130 discussed previously with regard to FIG. 1. In such embodiments, the GW may operate plurality of GW functions where at least one of the GW functions comprises the IDE redirection mechanisms discussed herein, and the other GW functions are functions related to carrying out various GW-related tasks. In one example, network appliance 220 may be a standalone computer device that is specifically manufactured to provide IoT devices 102 connectivity to a cloud or fog, such as an IoT GW or an automation hub. In another example, environment 200 may also include a wireless access point (WAP) or other like device that may provide network connectivity to the elements in environment 108 (not shown by FIG. 2), and the network appliance 220 may be communicatively coupled with the WAP through a wired or wireless connection. In other examples, the network appliance 220 may be a WAP, a home or residential GW device, a home server coupled with RF communications circuitry, a smallcell base station (e.g., a femtocell, picocell, home evolved nodeB (HeNB), a relay node, and/or the like), a router, a switch, a hub, a radio beacon, and/or any other like network element.

According to various embodiments, the network appliance 220 is a single hop or node away from the managed client computer systems 230. The term "hop" may refer to an individual node or intermediary device through which data packets traverse a path between a source device and a destination device, and a "hop count" may refer to a number of number of intermediate devices through which data passes between the source device and the destination device. As a single hop, there may be no (zero) intermediary devices between the network appliance 220 and the client systems 230. In this case, the network appliance 220 may be directly coupled to the client system 230 through a wired connection (e.g., Ethernet cable/LAN) or a direct wireless connection (e.g., a WiFi link, a LTE/NR device-to-device (D2D) link or sidelink, a BLE link, or the like. However, being a single hop network appliance 220 does not necessarily require the network appliance 220 to be directly coupled to a client system 230 without any intermediate entities; instead, the single hop network appliance 220 may be communicatively coupled to the client system 230 through one or more intermediate entities, such as routers or another intermediate NA. In these cases, the single hop network appliance 220 may be a network appliance 220 that is within closer network proximity to the faulty client system 230 than the cloud storage system 217 that contains the applications to be provisioned (e.g., boot image) and/or other network appliances 220 in the environment 200. The term "network proximity" may refer to a number of network hops or nodes that need to be traversed in order to reach a source device from a destination device (e.g., hop count), and/or "network proximity" may refer to an amount of reliable of a particular network or network connection between the network appliance 220 and the client system 230. In this way, copying the boot image from the cloud storage system 217 to the network appliance 220 and controlling or instructing the client system 230 to boot from the boot image copied to the local storage 255 of the network appliance 220 is more efficient than directly booting from the cloud storage system 217.

Figure 7:
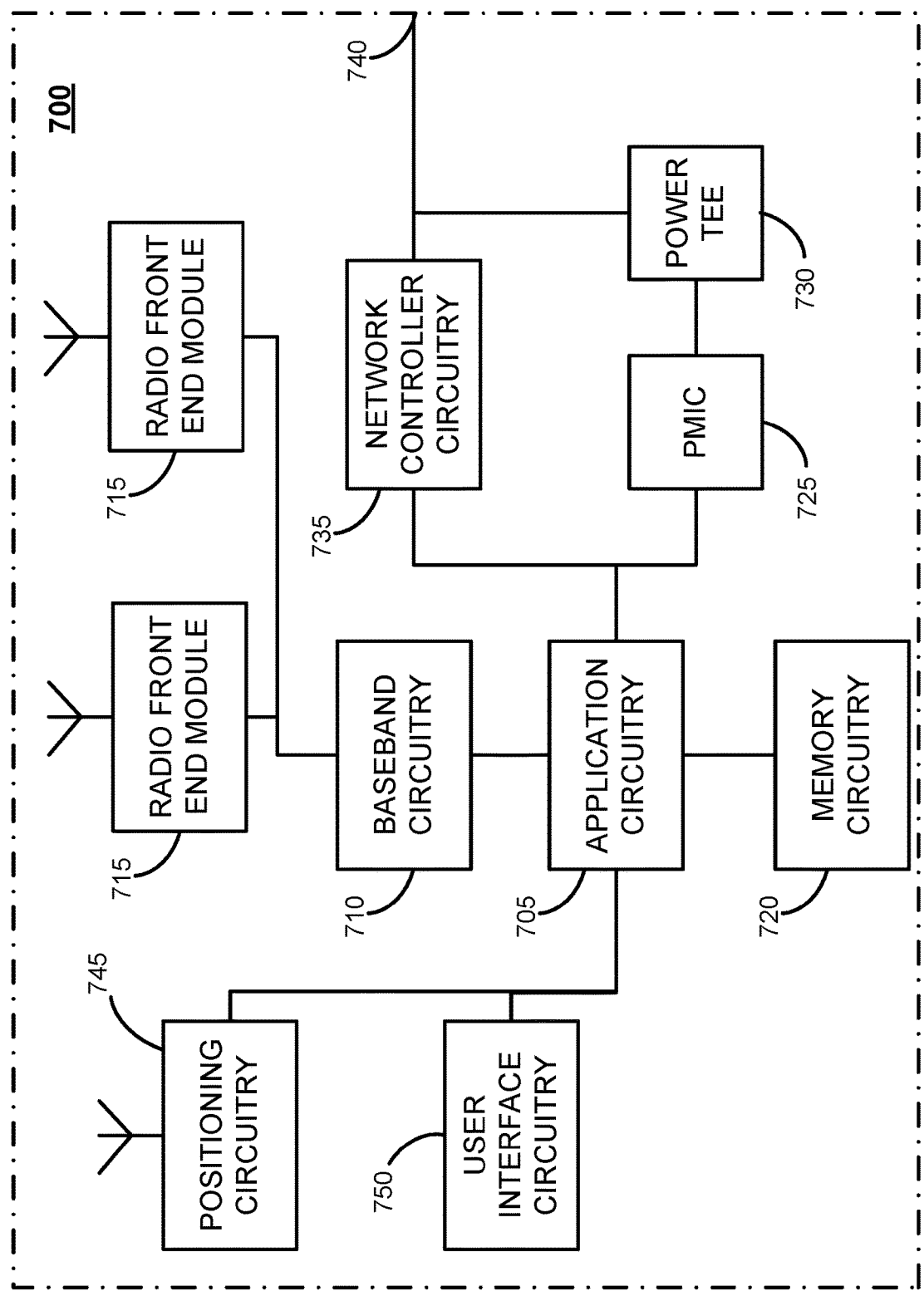
FIG. 7 illustrates an example of infrastructure equipment 700 in accordance with various embodiments.
Figure 8:
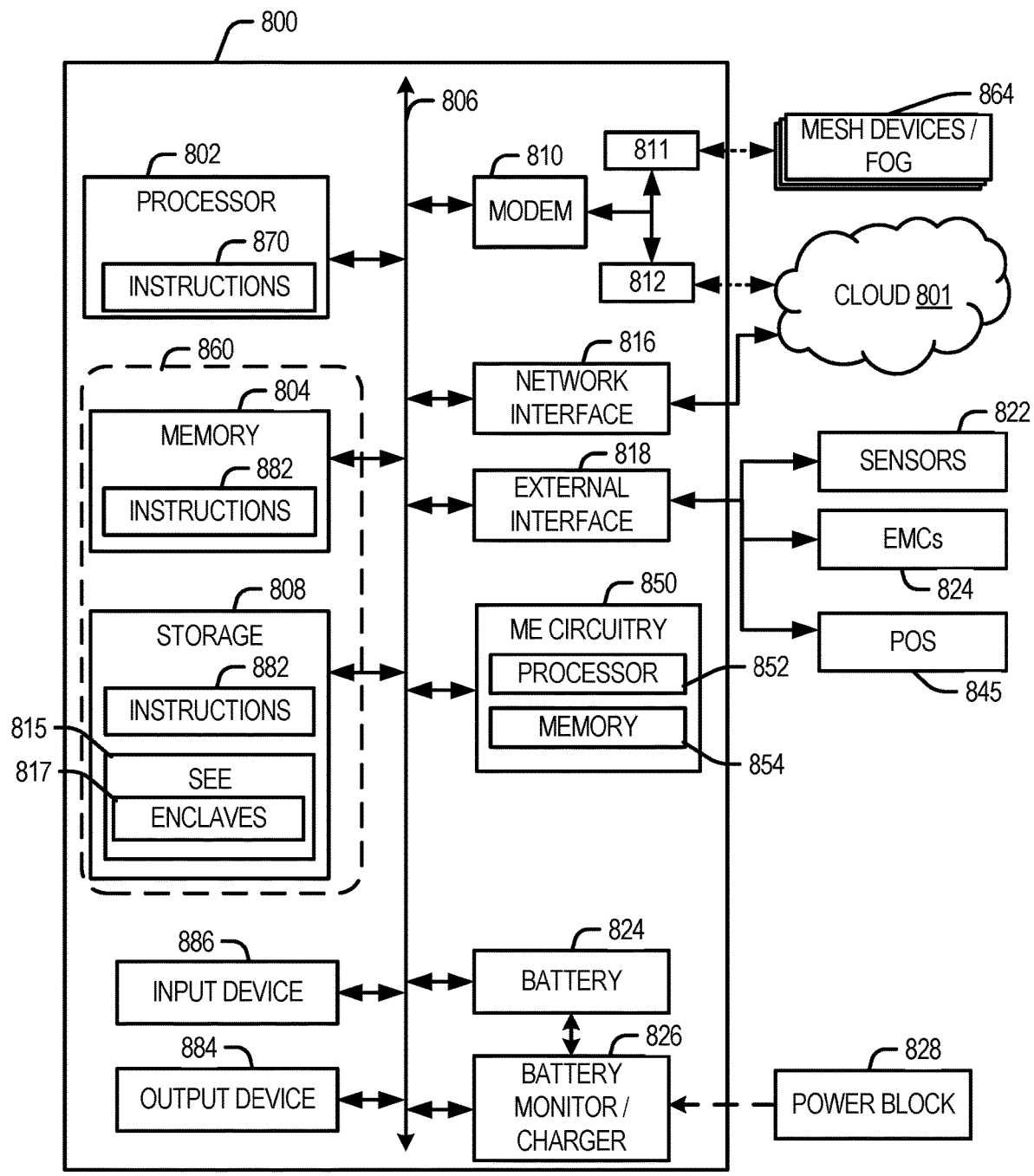
FIG. 8 illustrates an example of a platform 800 (or "device 800") in accordance with various embodiments.

Environment 200 also includes managed client systems 230, which is a suitable computing device that is capable of being managed by the RMS 210, such as the computing systems/devices discussed with regard to FIGS. 7 and 8. Each of managed client systems 230 include a management controller 231, which is a hardware and/or software element that enables remote out-of-band management of the client system 230. The management controller 231 may include a trusted execution environment (TEE) (also referred to as a Secure Execution Environment (SEE)). The TEE/SEE is a physical or virtual element that guarantees security, confidentiality, and integrity for program code and/or data loaded into the management controller 231. The TEE/SEE is an isolated execution environment that provides security features such as isolated execution, integrity of applications executing with the TEE/SEE, and confidentiality of program code and data within the TEE/SEE. The TEE/SEE may be a secure area of the host platform of the managed client system 230, or the TEE/SEE may be a separate physical device that is mounted on a same or different circuit board or package. Examples of the management controller 231 may include a Desktop and mobile Architecture Hardware (DASH) compliant Network Interface Card (NIC), Intel® Management/Manageability Engine (ME), Intel® Trusted Execution Engine (TXE)®, Intel® software guard Extensions® (Intel SGX®) AMD® Platform Security coProcessor (PSP), AMD® PRO A-Series Accelerated Processing Unit (APU) with DASH manageability, AMD® Secure Execution Environment, ARM® TrustZone® virtual processor(s), AMD® secure virtual machine, Qualcomm® Secure Execution Environment (QSEE), TSEE provided by TrustKernel®, Kinibi provided by Trustsonic®, among others.

The devices/systems in environment 200 operate as follows in accordance with various embodiments. At node 1, the managed client system 230 provides a network packet to the RMS 210 in response to detecting an error, failure, or fault at the client system 230. In embodiments, the network packet may be, or may include, a client initiated remote access (CIRA) packet 214. In one example, the network packet may be a WiFi (IEEE 802.11) packet, and a body portion of the WiFi packet may include the CIRA packet 214. In another example, the network packet may be an Ethernet (IEEE 802.3) packet or frame, and a payload portion of the Ethernet packet/frame may include the CIRA packet 214. In another example, the CIRA packet 214 may be transmitted by itself over a suitable wired or wireless connection.

The CIRA packet 214 is a type of data packet that is specifically used for remote management services (e.g., RMS 210). The CIRA packet 214 includes a network appliance (NA) identifier field 216, a failover capability field 219, and client configuration information field 218.

The NA identifier field 216 is to include a NA identifier of the network appliance 220. The NA identifier in the NA identifier field 216 may indicate whether the network appliance 220 is a single hop GW or otherwise indicate a hop count of the network appliance 220 with respect to a faulty client system 230. The NA identifier may be one or a combination of any of the following identifiers (IDs): an IP address of the network appliance 220, a port number of the network appliance 220 (e.g., a secure or management port used for remotely managing the client system 230, an Intel® AMT® port number, or the like), a MAC address of the network appliance 220, an assigned domain name of the network appliance 220, a uniform resource locator (URL) or universal resource identifier (URI) for locating and/or accessing the network appliance 220, a unique device identification (UDI) of the network appliance 220, an International Mobile Subscriber Identity (IMSI) of the network appliance 220, a Mobile Station/Subscriber International ISDN Number (MSISDN) of the network appliance 220, an equipment identity or serial number of the network appliance 220 (e.g., as issued by an OEM of the network appliance 220), and/or any suitable identifier that allows an external management console (e.g., RMS 210) to locate the GW 220. Additionally or alternatively, the NA identifier field 216 may include or carry a digital signature or authorization/authentication credentials associated with the network appliance 220 (e.g., which may be inserted into the CIRA packet 214 by the network appliance 220 or by the management controller 231). According to various embodiments, the NA identifier of a single hop network appliance 220 of the client system 230 may be obtained using one or more of the following embodiments:

In a first embodiments, the network appliance 220 obtains incoming network packets and inspects the incoming network packets for a network packet that includes or indicates a port number that targets a management (RMS) port (e.g., an Intel® AMT® management port) of the RMS 210. When this network packet is detected, the network appliance 210 inspects a header portion of the network packet to identify a CIRA packet 214, inserts its own NA identifier into the NA identifier field 216, and sets the failover capability field 219 to indicate that the network appliance 220 is capable of performing an IDE redirection from local storage 255 (or inserts one or more values to indicate the failover/IDE redirection capabilities of the network appliance 220). In some embodiments, the CIRA packet 214 may be included in a body portion of the network packet, and the network appliance 220 may inspect the body portion of the network packet for the CIRA packet 214.

In a second embodiment, before sending a CIRA packet 214, a management console of the RMS 210 may query one or more single hop edge or Fog network appliances 220 for their respective NA identifiers. The management console may query the one or more single hop edge or Fog network appliances 220 using a special information query network packet or some other suitable message/data packet. If/when the query is successful, the management console may select one of the queried GWs 220 for provisioning the faulty client system 230, packages the NA identifier of the determined/identified network appliance 220 into a CIRA packet 214, and sets the failover capability field 219 to indicate that the selected network appliance 220 is capable of performing an IDE redirection from local storage 255 (or inserts one or more values to indicate the failover/IDE redirection capabilities of the selected network appliance 220). The management console may identify or select the network appliance 220 as a single hop network appliance 220 based on network topology information, location information associated with the NA identifier, the NA identifier itself, using network-based positioning mechanisms, and/or using any other suitable information or mechanisms for identifying the location of the GWs 220.

In a third embodiment, the NA identifier may be sent to a client system 230 (or a management controller 231 of the client system 230) upon establishing a network connection with the single hop network appliance 220 and/or the RMS 210. For example, when the network appliance 220 supports Dynamic Host Configuration Protocol (DHCP) (or variants thereof), the network appliance 220 may send its NA identifier and/or other relevant information to a client device system 230 during a DHCP connectivity handshake and IP address assignment procedure. In this example, the network appliance 220 may receive a DHCP discovery message from the client system 230 during a DHCP connectivity handshake procedure, generate a DHCP offer message to include an internet protocol (IP) address to be assigned to the client system 230 and an single hop NA identifier (SHNAI) of the network appliance 220, and send the DHCP offer message to the client system 230 in response to the DHCP offer message. In this example, the SHNAI identifies the network appliance 220 and indicates that the network appliance 220 is a single (one) hop away from the client system 230. In another variation of this example, the network appliance 220 may include the SHNAI in a DHCP acknowledgement message in response to receipt of a DHCP request message from the client system 230 (in this example, the DHCP request message may be sent by the client system 230 in response to the DHCP offer message from the network appliance 220). In either case, when the client system 230 receives the DHCP message with the SHNAI, the client system 230 (and/or the management controller 231) stores the SGHI in a secure storage location (e.g., a Trusted Platform Module (TPM) storage, a SEE or TEE, a secure region in a management engine (e.g., ME circuitry 850 of FIG. 8), or the like). The client system 230 and/or the management controller 231 may obtain the stored SGHI and insert the SGHI in a NA identifier field 216 of CIRA packet 214 when a fault, error, failure, etc. is detected.

Referring back to FIG. 2, the failover capability field 219 is to include or store a failover capability of the network appliance 220 and/or the client system 230 (or management controller 231). The failover capability indicates whether both the management controller 231 coupled to the faulty client 230 and the network appliance 220 are capable to perform the IDE redirection failover mechanism of the embodiments discussed herein. For example, the failover capability may indicate that the management controller 231 and stored firmware supports the IDE redirection and is able to redirect the faulty client system 230 to boot from a remote disk partition, including a disk partition located in the local storage 255 of the network appliance 220. In addition, the failover capability indicates that the network appliance 220 has the necessary capabilities (e.g., hardware and firmware capabilities, etc.) and capacity to store (e.g., storage resources, computational resources, etc.) one or more applications (e.g., an OS partition or boot image), and to enable the application(s) stored in the local storage 255 to be access by a downstream client system 230 through a suitable interface (e.g., a LAN interface or an Ethernet port)) of the network appliance 220. The failover capability in the failover capability field 219 informs the RMS 210 that the RMS 210 can safely copy the application(s) (e.g., OS boot image) from the storage system 217 to the local storage 255 of the network appliance 220 and invoke the faulty client system 230 to be provisioned with the application(s) from the local storage 255 of the network appliance 220 (e.g., boot the OS from the local storage 255 of the network appliance 220). If the failover capability field 219 is not set or otherwise includes a value indicating that the network appliance 220 is not capable of storing or provisioning the faulty client system 230 with the application(s) (e.g., a value of zero), the RMS 210 may perform a fallback procedure to perform a normal IDE redirection, wherein the RMS 210 invokes the faulty client system 230 to be provisioned with the application(s) from the storage system 217 (e.g., boot the OS from a physical or virtual memory location in the storage system 217). This may occur when the client system 230 includes an older management controller 231 or when the network appliance 220 is a legacy GW device that does not support the features described herein.

The configuration information field 218 includes or carries client configuration information. The client configuration information is to indicate information for provisioning the client system 230 after a fault, error, or failure occurs. The configuration information may include, inter alia, OS information (e.g., OS type: Windows 10, Linux, Android, iOS, Tizen, etc.; OS version; etc.); a client description (e.g., serial number or equipment identifier (ID); domain name of the client system 230, functionality or device type of the client system 230; a Declaration of Conformity ("DoC"), data structure, etc. indicating that the client system 230 conforms/complies with an accepted standard and/or a claim that a manufacturer has tested the product to verify compliance with that standard; digital certificates or IDs of digital certificates issued to the client system 230, etc.); an indication of the application(s) to be provisioned in the client system 230 (e.g., list of one or more applications that the client systems 230 is to execute after recovering from the fault, error, or failure, such as a media player for digital signage); and/or any other client information that may assist the failover module 215 to recover or repair the faulty client system 230.

In one example, the RMS 210 may be by Intel® AMT®, and the CIRA packet 214 may be targeted to a manageability presence service (MPS) gateway device (not shown by FIG. 2). In this example, the IP address or a locator of an MPS server (not shown by FIG. 2) is preconfigured and automatically inserted into the CIRA packet 214 by the management controller 231. When the client system 230 detects a fault, error, or failure, the management controller 231 coupled to the client system 230 detects the issue, generates the CIRA packet 214, and sends the CIRA packet 214 to the MPS gateway. The CIRA packet 214 is routed to (or may find its way to) the MPS gateway using a suitable communications mechanism. When received, the CIRA packet is to cause or invoke the MPS gateway to establish a secure out of band (OOB) management connection between the management controller 231 of the faulty client system 230 that sent the CIRA packet and a management console of the RMS 210. The management console may be located within an enterprise environment that is protected by a firewall of the MPS gateway. In embodiments, the MPS gateway is a separate entity/device than network appliance 220. The MPS gateway is not shown by FIG. 2, but in various implementations, the MPS gateway may be located at the edge of the cloud or network 232 where the CIRA packet is intercepted by the RMS 210 (e.g., where a firewall gateway to the cloud hosted RMS 210 or other cloud hosted services may be located).

At node 2, upon reception of the CIRA packet 214, the RMS 210 inspects the NA identifier 216 and the client configuration information 218, and invokes the failover module 215 (or an individual instance of the failover module 215) to identify and copy one or more applications (e.g., a suitable client OS bootable disk partition and/or software applications) from the storage system 217 to the local storage 255 of the network appliance 220. In embodiments, the RMS 210 inspects the failover capability field 219 in the CIRA packet 214, and if the field is set, asserted, or otherwise indicates that the client system 230 and the network appliance 220 is capable of implementing the IDE redirection of the embodiments herein, the RMS 210 invokes the failover module 215 inspect the client configuration information in the client configuration field 218 of the CIRA packet 214, and identifies one or more applications (e.g., suitable client OS bootable disk partition) the storage system 217. The failover module 215 then inspects the NA identifier in the NA identifier field 216 and copies the applications (e.g., client OS bootable partition) from the storage system 217 to the local storage 255 of the network appliance 220.

In some embodiments, various functions of the failover module 215 may be performed by a remote management console of the RMS 210. In such embodiments, the remote management console may locate the single hop edge or Fog network appliance 220 associated with a faulty client system 230 (e.g., through the NA identifier of the NA identifier field 216 and capabilities indicated by the failover capability field 219 of a CIRA packet 214 sent from a management controller 231).

At node 3, the failover module 215 also invokes the management controller 231 of the faulty client system 230 to perform an IDE redirection and boot the client OS from the local storage 255 of the single hop network appliance 220 through a suitable interface provided by the network appliance 220 (e.g., a LAN interface and/or a direct Ethernet connection between the client system 230 and the network appliance 220).

In some embodiments, at node 4, after the faulty client system 230 has successfully booted up from the IDE redirection at node 3, the failover module 215 may further inspect the client configuration information of the client configuration information field 218 and invoke the client to load and execute additional software applications from the storage system 217 and/or from the local storage 255 of the network appliance 220 in order to restore the device functionality of the client system 230.

According to various embodiments, by relocating various applications, such as a client OS bootable disk partition, from a remote network storage location within the storage system 217 (e.g., connected to the client system 230 via a wireless connection) to a single hop NA 220 of a faulty client system 230 (e.g., connected to the client system 230 via a LAN connection) for failover IDE redirection purposes may reduce signaling and computational overhead, and may speed up the recovery process of faulty client systems 230. This is because executing a remote applications, such as a client OS) through a single hop NA 220 over a LAN connection may reduce or remove network limitations associated with a wireless or wide area networks, which may increase the reliability, performance, and usability of the client systems 230.

Figure 3A:
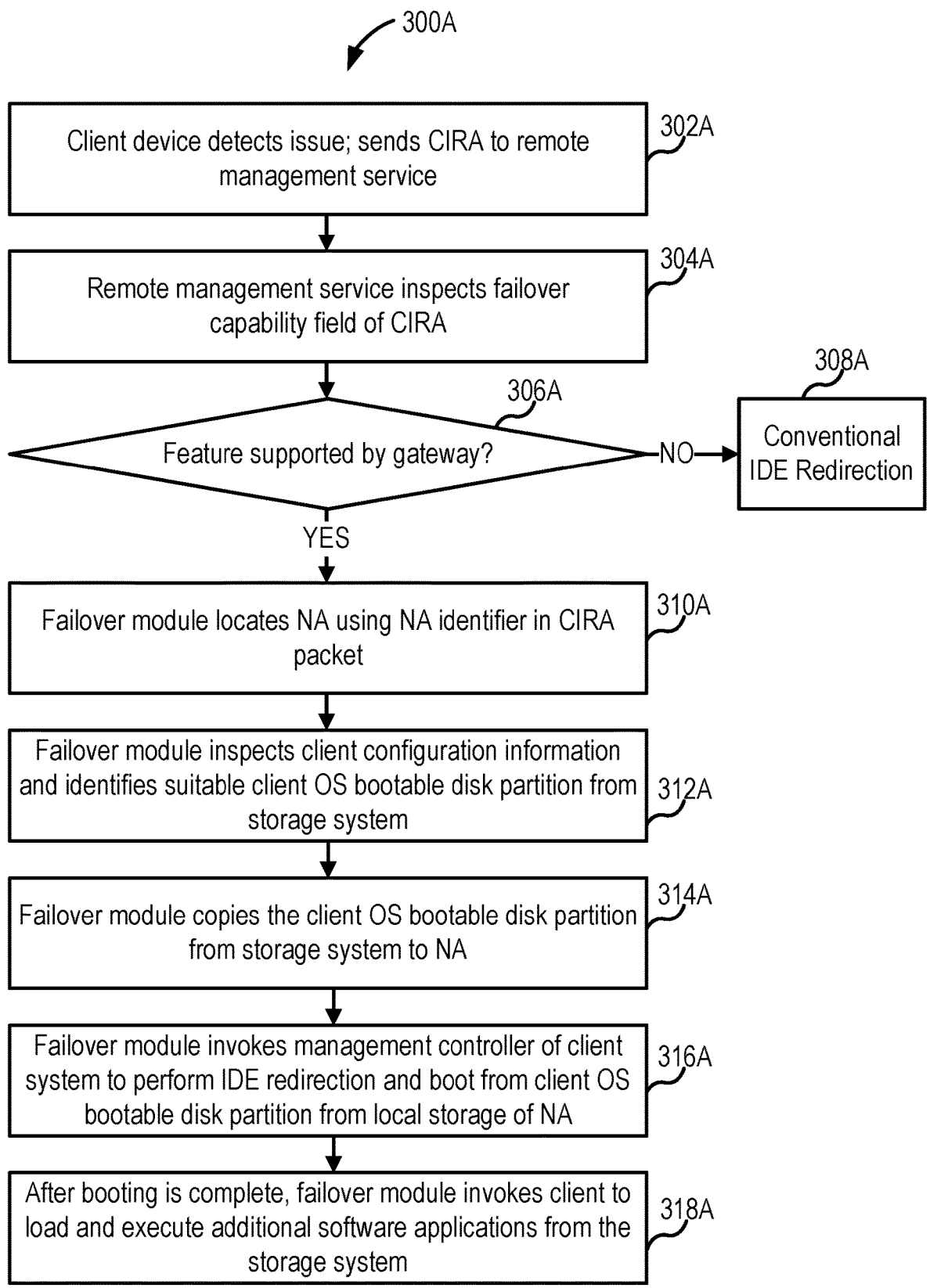
FIGS. 3A-3D show example processes for practicing the embodiments of the present disclosure. In particular.

FIGS. 3A-3D illustrate processes 300A-300D, respectively, for providing the IDE redirection technology of the present disclosure. In some embodiments, some or all of the process 300A may be practiced by components shown and/or described with respect to the computing environment 200 of FIG. 2, the cloud and internet of things (IoT) networks shown and described with respect to FIGS. 1 and 4-6, and/or the computing devices/systems of FIGS. 7-8. Some of the processes 300A-300D may include communications between various devices, and it should be understood that such communications may be facilitated by the various circuitry as described with regard to FIGS. 7-8 using the various messages/protocols discussed herein. Moreover, while particular examples and orders of operations are illustrated in FIGS. 3A-3D, the depicted orders of operations should not be construed to limit the scope of the embodiments in any way. Rather, the depicted operations may be re-ordered, broken into additional operations, combined, and/or omitted altogether while remaining within the spirit and scope of the present disclosure FIG. 3A shows a process 300A for providing an IDE redirection, according to various embodiments. Process 300A may begin at operation 302A, where processor circuitry of the client system 230 detects an issue, such as a fault, failure, error, etc., generates a CIRA packet 214, and network interface circuitry of the client system 230 sends the CIRA packet 214 to the RMS 210. At operation 304A, network interface circuitry of the RMS 210 receives the CIRA packet 214 and processor circuitry of the RMS 210 inspects the failover capability field 219 of the CIRA packet 214.

At operation 306A, the processor circuitry of the RMS 210 determines whether the failover feature is supported by the network appliance 220 based on the values/information in the failover capability field 219. If at operation 306A the RMS 210 determines that the failover feature is not supported by the network appliance 220, the processor circuitry of the RMS 210 proceeds to operation 308A to instruct the client system 230 to perform a convention IDE redirection from the storage system 217. If at operation 306A the RMS 210 determines that the failover feature is supported by the network appliance 220, the processor circuitry of the RMS 210 proceeds to operation 310A to invoke the failover module 215, which locates the network appliance 220 using the NA identifier in the NA identifier field 216 of the CIRA packet 214.

At operation 312A, the failover module 312A inspects the client configuration information in the client configuration information field 218 of the CIRA packet 214, and identifies a suitable client OS bootable disk partition or OS image to be provisioned in the client system 230 based on the client configuration information. In some embodiments, the failover module may also identifier other applications to be provisioned in the client system 230 at operation 312A. The failover module also locates the location(s) of the one or more applications in the storage system 217 at operation 312A. At operation 314A, the failover module 215 copies the client OS bootable disk partition or OS image to the local storage 255 of the network appliance 220, or instructs the network appliance 220 to obtain the client OS bootable disk partition or OS image from the storage system 217 and to store the client OS bootable disk partition or OS image in the local storage 255.

At operation 316A, the failover module 215 invokes or instructs the management controller 231 of the client system 230 to perform an IDE redirection to the network appliance 220 and boot from the client OS bootable disk partition or OS image in the local storage 255 of network appliance 220. At operation 318A, the failover module 215 invokes or instructs the processor circuitry of client system 230 to load and execute one or more additional applications from the storage system 217 and/or the local storage 255 of the network appliance 220. After operation 318A, process 300A may end or repeat as necessary.

Figure 3B:
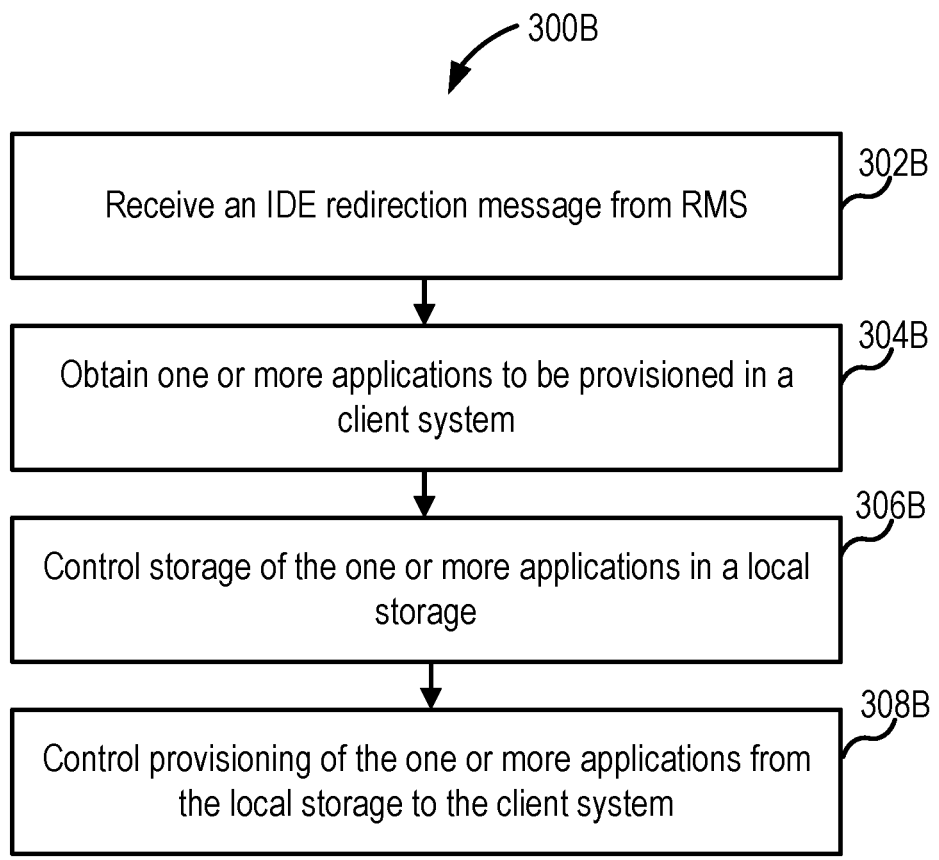

FIG. 3B shows a process 300B for remote management of a client system 230 as performed by a single hop network appliance 220, according to various embodiments. Process 300B may begin at operation 302B, where network interface circuitry of the network appliance 220 receives an IDE redirection message from the RMS 210. The IDE redirection message may be sent to the network appliance 220 when the network appliance 220 is one hop (or a single hop) away from the client computer system 230 that experiences a fault. The IDE redirection message is to indicate one or more applications to be provisioned in the client computer system 230.

At operation 304B, the processor circuitry of the network appliance 220 controls the network interface circuitry of the network appliance 220 to obtain the one or more applications from the storage system 217. In embodiments, the IDE redirection message may include or indicate the location(s) of the one or more applications in or at the storage system 217. At operation 306B, the processor circuitry of the network appliance 220 controls storage of the one or more applications indicated by the IDE redirection message in the local storage 255 of the network appliance 220. At operation 308B, the processor circuitry of the network appliance 220 controls provisioning of the one or more applications from the local storage 255 to the client computer system 230. In embodiments, the provisioning of the one or more applications may be based on the IDE redirection message obtained at operation 302B or may be in response to receipt of a separate provisioning instruction obtained from the RMS 210. After operation 308B, process 300B may end or repeat as necessary.

Figure 3C:
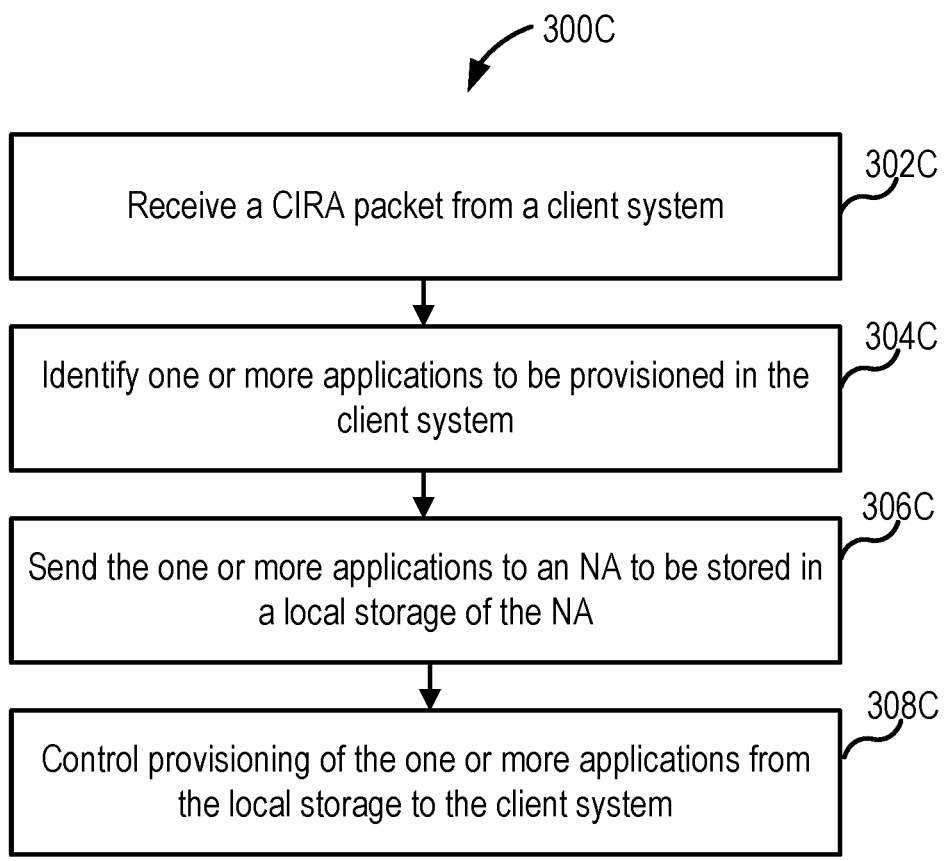

FIG. 3C shows a process 300C for remote management of a client system 230 as performed by a computer system that provides an RMS 210 (e.g., a remote management console of the RMS 210, one or more servers, etc.), according to various embodiments. Process 300C may begin at operation 302C, where network interface circuitry of the system receives a CIRA packet 214 from a client computer system 230. In embodiments, the CIRA packet 214 includes a single hop NA identifier (SHNAI) that identifies a network appliance 220 that is one hop away from the client computer system 230. At operation 304C, processor circuitry of the computer system operates a failover module 215 to identify one or more applications to be provisioned in the client computer system 230. In embodiments, the one or more applications may be identified from client configuration information of a client configuration information field 218 of the CIRA packet 214. At operation 306C, the processor circuitry of the computer system operates the failover module 215 to control the network interface circuitry of the computer system to send the one or more applications to be stored in a local storage of the network appliance 220. In some embodiments, the processor circuitry may control the network interface circuitry to send an instruction (e.g., an IDE redirection message) to instruct the network appliance 220 to obtain the one or more applications from the storage system 217. At operation 308C, the processor circuitry of the computer system is to operate the failover module 215 to instruct the network appliance 220 to provision the one or more applications in the client computer system 230. In embodiments, the failover module 215 may control the network interface circuitry to send a provisioning message to the network appliance 220 to instruct the GW to provision the one or more applications in the client system 230. After operation 308C, process 300C may end or repeat as necessary.

Figure 3D:
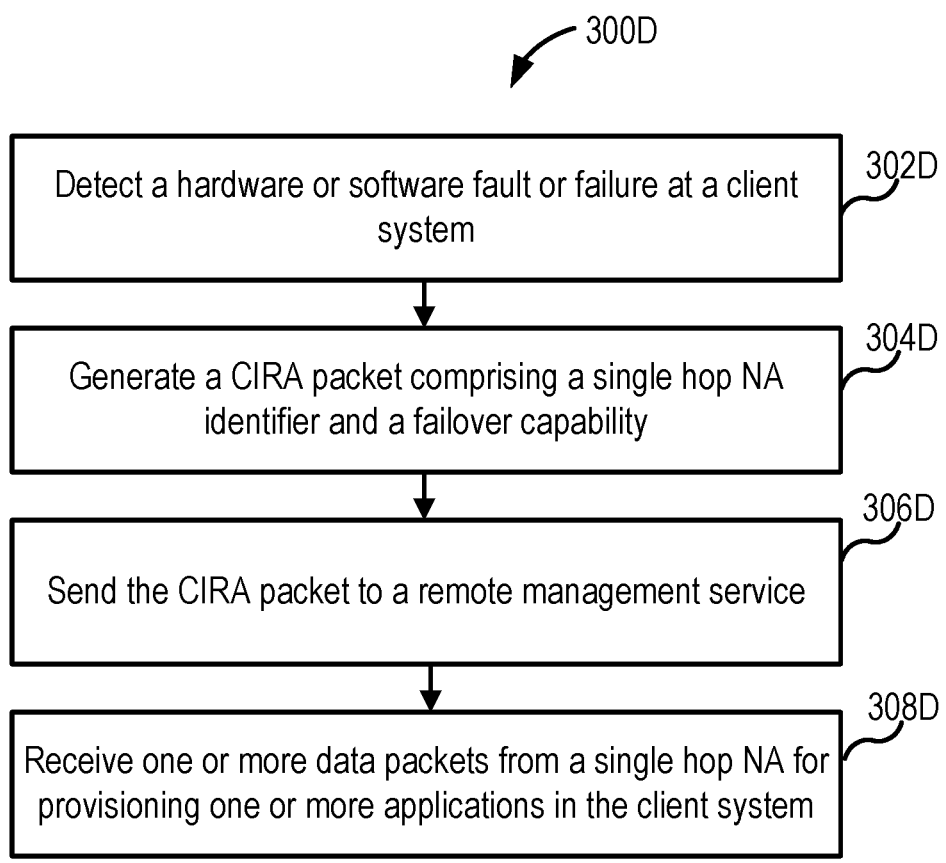

FIG. 3D shows a process 300D for remote management of a client system 230 as performed by the client system 230, according to various embodiments. Process 300D may begin at operation 302D, where processor circuitry of the client system 230 detects a hardware or software fault or failure. At operation 304D, the processor circuitry of the client system 230 generates a CIRA packet 214 to include a single hop NA identifier (SHNAI) in a NA identifier field 216 of the CIRA packet 214 and a failover capability in a failover capability field 219 of the CIRA packet 214. In embodiments, the processor circuitry of the client system 230 generates a CIRA packet 214 to also include client configuration information in a client configuration information field 218 of the CIRA packet 214. At operation 306D, the communication circuitry of the client system 230 sends the CIRA packet to the RMS 210. In embodiments, the communication circuitry may be network interface circuitry for sending the CIRA packet over a wired connection or the communication circuitry may be a wireless communications system/chipset for wirelessly transmitting the CIRA packet. In embodiments, management engine (ME) circuitry of the client system 230 may control the communication circuitry to send the CIRA packet, or may perform various authentication and/or encryption/decryption procedures to provide a secure communications channel with the RMS 210. At operation 308D, the communication circuitry of the client system 230 receives one or more data packets from a NA associated with the SHNAI for provisioning an application from the local storage of the single hop network appliance 220. In embodiments, the ME circuitry of the client system 230 may manage the IDE redirection of the client computer system 230 to be provisioned from a local storage of the network appliance 220 when the fault is detected at the client computer system 230 at operation 302D. After operation 308D, process 300D may end or repeat as necessary.

Figure 4:
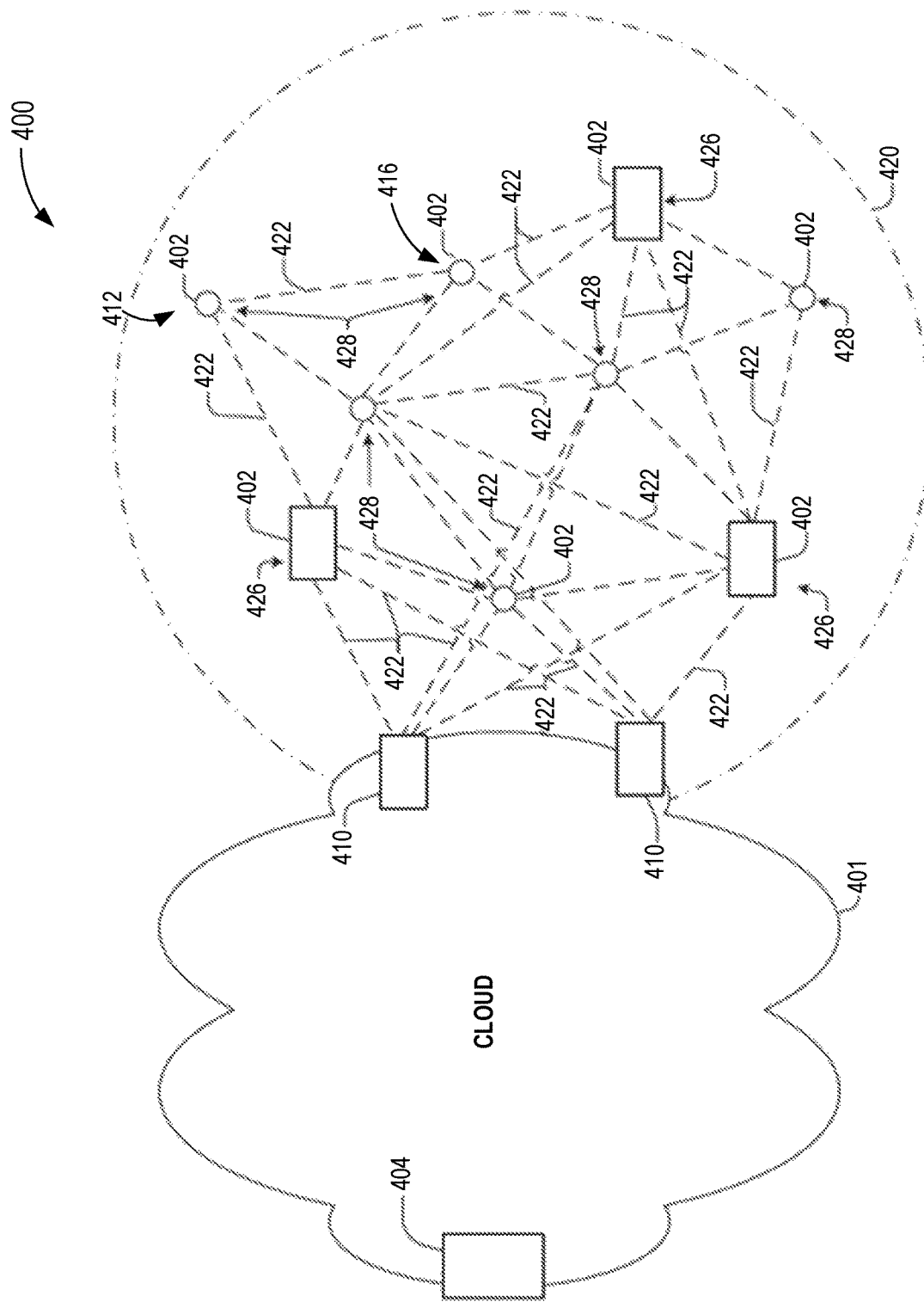
FIG. 4 is a diagram schematically illustrating a topology of a cloud and IoT network, according to various embodiments.

FIG. 4 is a diagram schematically illustrating a topology of a cloud and Internet of Things (IoT) network 400, according to various embodiments. In some embodiments, the cloud and IoT network 400 may be a mesh network. In some embodiments, the cloud and IoT network 400 may include a cloud computing network, or cloud 401, in communication with a mesh network of IoT devices 402, that may be termed a fog 420, operating at the edge of the cloud 401. The fog device 420 may be established in accordance with specifications released by the OpenFog Consortium (OFC), the Open Connectivity Foundation™ (OCF), among others. To simplify the diagram, not every IoT device 402 is labeled. In some embodiments, the cloud 401 may include a server 404, which provides RMS 210 discussed previously. Server 404 may also represent a plurality of servers (e.g., a server pool) that provides RMS 210.

In embodiments, fog computing systems, such as fog device 420, may be mechanisms for bringing cloud computing functionality closer to data generators and consumers wherein various network devices run cloud application logic on their native architecture Fog computing systems may be used to perform low-latency computation/aggregation on the data while routing it to a central cloud computing service for performing heavy computations or computationally burdensome tasks. On the other hand, edge cloud computing consolidates human-operated, voluntary resources such as desktop PCs, tablets, smartphones, nano data centers as a cloud. In various implementations, resources in the edge cloud may be in one to two-hop proximity to the IoT devices 404, which may result in reducing overhead related to processing data and may reduce network delay.

In some embodiments, the fog device 420 may be a consolidation of IoT devices 404 and/or networking devices, such as routers and switches, with high computing capabilities and the ability to run cloud application logic on their native architecture. Fog resources may be manufactured, managed, and deployed by cloud vendors, and may be interconnected with highspeed, reliable links. Moreover, Fog resources reside farther from the edge of the network when compared to edge systems but closer than a central cloud infrastructure. Fog devices are used to effectively handle computationally intensive tasks offloaded by edge resources.

In embodiments, the fog device 420 may operate at the edge of the cloud 401. In some embodiments, the fog device 420 operating at the edge of the cloud 401 may overlap or be subsumed into an edge network of the cloud 401. In embodiments, the edge network of the cloud 401 may overlap with the fog device 420, or become a part of the fog device 420. Furthermore, the fog device 420 may be an edge-fog network that includes an edge layer and a fog layer. The edge layer of the edge-fog network includes a collection of loosely coupled, voluntary and human-operated resources (e.g, the aforementioned edge devices) The Fog layer resides on top of the edge layer and is a consolidation of networking devices such as those discussed herein.

Data may be captured, stored/recorded, and communicated among the IoT devices 404. Analysis of the traffic flow and control schemes may be implemented by aggregators 406 that are in communication with the IoT devices 404 and each other through a mesh network. Data may be uploaded to the cloud 401, and commands received from the cloud 401, through GWs 424 that are in communication with the IoT devices 404 and the aggregators 406 through the mesh network. Unlike the traditional cloud computing model, in some implementations, the cloud 401 may have little or no computational capabilities and only serves as a repository for archiving data recorded and processed by the fog device 420. In these implementations, the cloud 401 centralized data storage system and provides reliability and access to data by the computing resources in the fog 420 and/or edge devices. Being at the core of the architecture, the Data Store is accessible by both Edge and Fog layers of the aforementioned edge-fog network.

Figure 5:
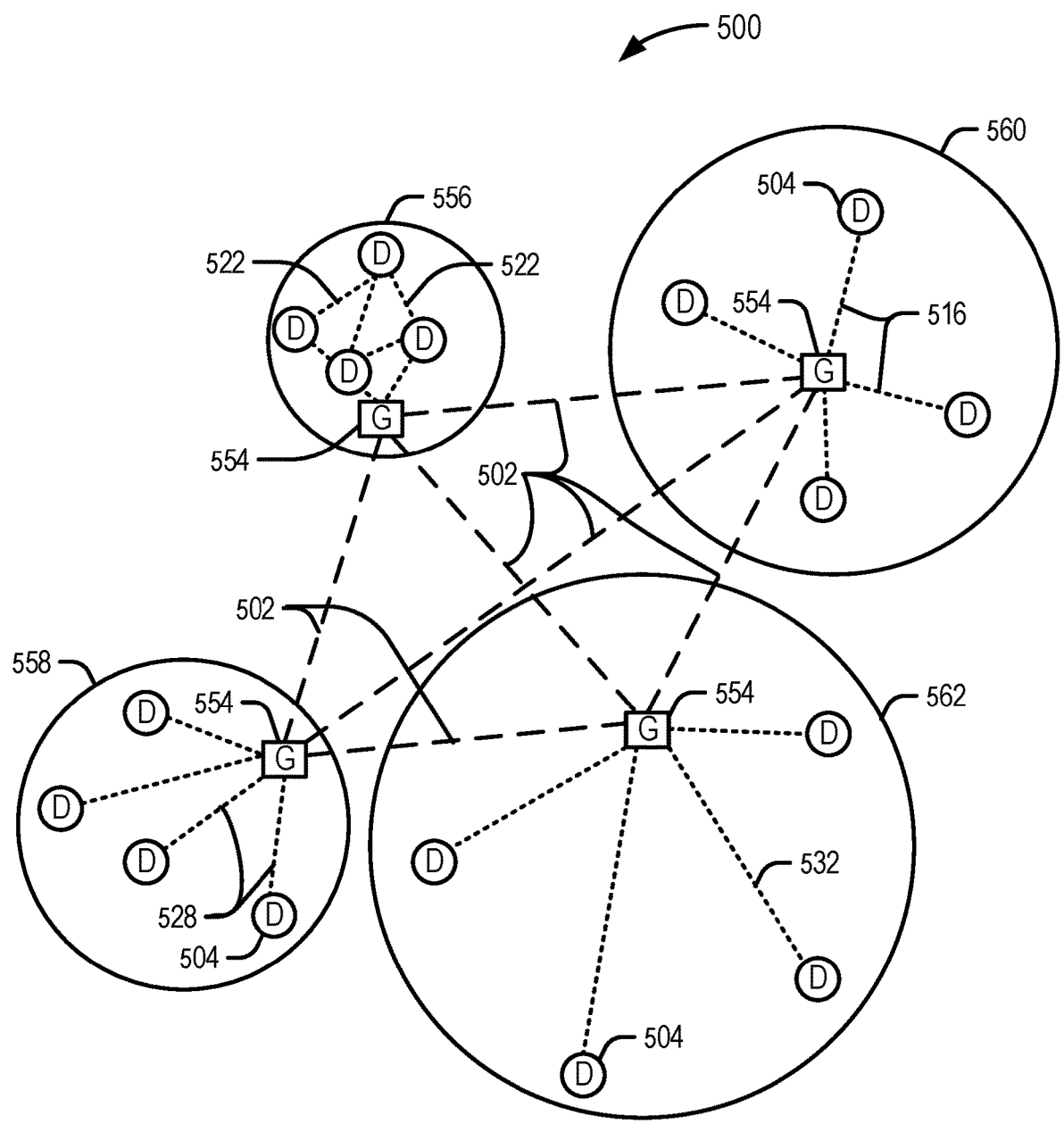
FIG. 5 illustrates an example domain topology for respective IoT networks coupled through links to respective network appliances, according to various embodiments.
Figure 6:
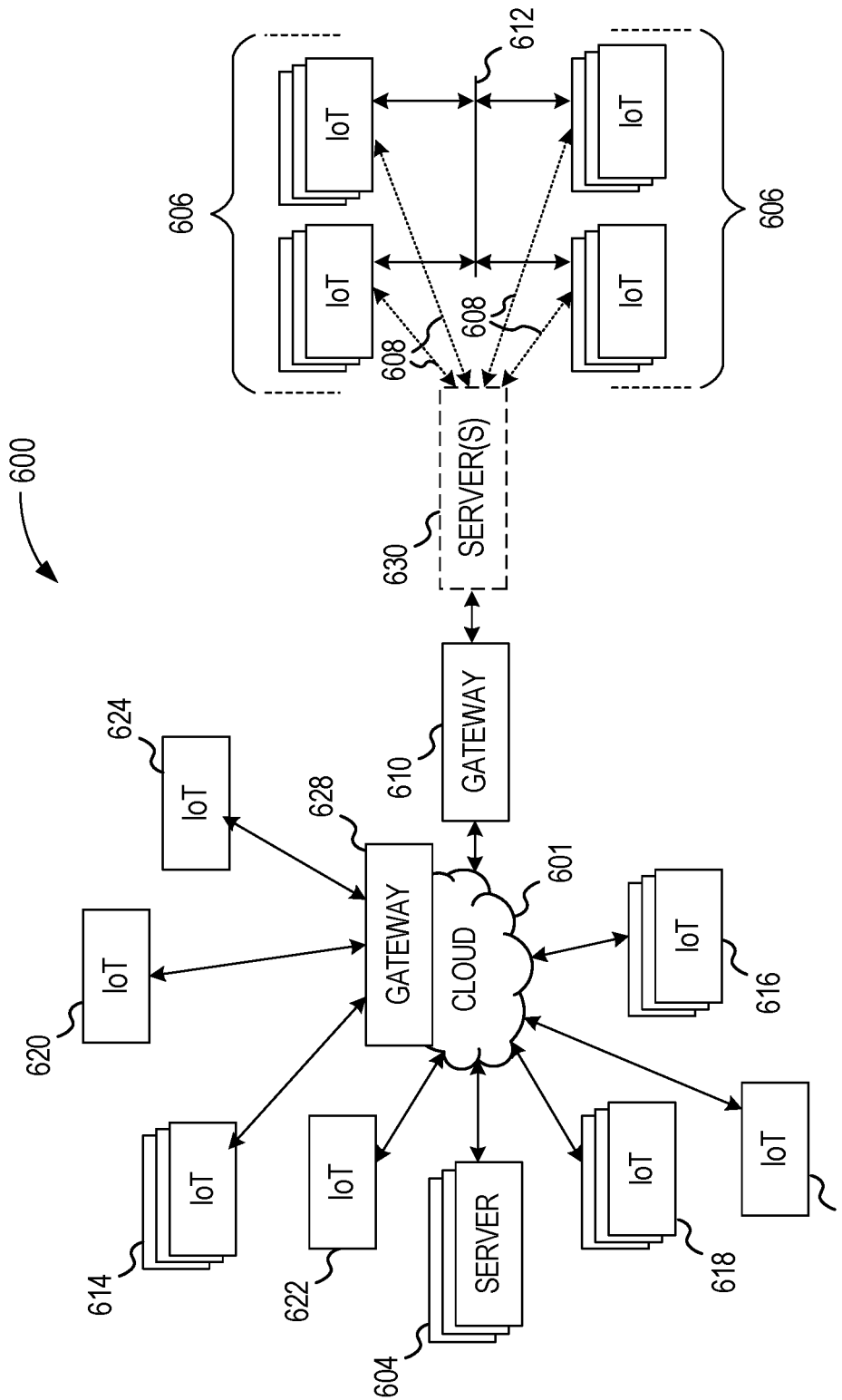
FIG. 6 illustrates an environment including a cloud computing network in communication with a number of IoT devices, according to various embodiments.

Similar to FIGS. 1 and 5-6, in embodiments, one or more of IoT devices 404, aggregators 406, and so forth, may be incorporated with the various embodiments described herein, in particular, with references to FIGS. 2-3D. In addition, the fog device 420, or any of grouping of devices discussed herein, may include the one or more components, devices systems, etc. discussed infra with regard to FIG. 7 or 8.

Any number of communications links may be used in the fog device 420. Shorter-range links 408, for example, compatible with IEEE 802.15.4 may provide local communications between IoT devices that are proximate to one another or other devices. Longer-range links 410, for example, compatible with LPWA standards, may provide communications between the IoT devices and the GWs 424. To simplify the diagram, not every communications link 408 or 410 is labeled with a reference number.

The fog 420 may be considered to be a massively interconnected network where a number of IoT devices 402 are in communication with each other, for example, by communication links 422. In various embodiments, the communication links 422 may include wired communication links, wireless communication links, and/or a combination of wired and wireless communication links. Not all communication links are shown and/or labeled for clarity. In some embodiments, one or more of the communication links 422 may be radio communication links. In some embodiments, the cloud 401 and the fog 420 may be established and/or operated using the open interconnect consortium (OIC) standard specification 1.0 released by the Open Connectivity Foundation™ (OCF) in December 2015, or a newer version of the OIC standard specification. This standard allows devices to discover each other and establish communications for interconnects. Other interconnection protocols may also be used in some embodiments, including, for example, the AllJoyn protocol from the AllSeen alliance, the optimized link state routing (OLSR) Protocol, or the better approach to mobile ad-hoc networking (B.A.T.M.A.N.), or any other suitable technique or protocol.

Communications from any IoT device may be passed along a most convenient path between any of the IoT devices to reach the GWs 424. In these networks, the number of interconnections may provide substantial redundancy, allowing communications to be maintained, even with the loss of a number of IoT devices.

Three types of IoT devices 402 are shown in this example, GWs 424, data aggregators 426, and sensors 428, although any suitable combination of IoT devices 402 and functionality may be used in various embodiments. In some embodiments, one or more of the GWs 424 may correspond to an edge or Fog network appliance having components and/or functionality described with respect to network appliance 220 of FIG. 2. The GWs 424 may be edge devices that provide communications between the cloud 401 and the fog 420, and may also provide a backend process function for data obtained from the sensors 428, such as motion data, flow data, temperature data, and the like. The data aggregators 426 may collect data from any number of the sensors 428, and may perform the back end processing function for the analysis. The results, raw data, or both may be passed along to the cloud 401 through the GWs 424. The sensors 428 may be full IoT devices 402 in some embodiments, capable of both collecting data and processing the data. In some embodiments, the sensors 428 may be more limited in functionality and may collect the data but may allow the data aggregators 426 or GWs 424 to process the data. In some embodiments, one or more of the data aggregators 426 or other components of the fog 420 may be or include components of a managed client (e.g., the managed client systems 230 of FIG. 2).

Communications from any IoT device 402 may be passed along the most convenient path between any of the IoT devices 402 to reach the GWs 424. In these networks, the number of interconnections may provide substantial redundancy, allowing communications to be maintained even with the loss of a number of IoT devices 402 in various embodiments. Further, the use of a mesh network may allow IoT devices 402 that are very low power or located at a distance from infrastructure to be used, as the range to connect to another IoT device 402 may be much less than the range to connect to the GWs 424 in some embodiments.

In embodiments, the IoT devices 402 may be configured using an imperative programming style, (e.g., with each IoT device 402 having a specific function and communication partners). However, the IoT devices 402 forming the fog 420 may be configured in a declarative programming style, allowing the IoT devices to reconfigure their operations and communications, such as to determine needed resources in response to conditions, queries, and device failures. This may be performed as transient IoT devices, such as the devices 412, 428, 416, join the fog device 420. As transient or mobile IoT devices enter or leave the fog 420, the fog device 420 may reconfigure itself to include those devices. This may be performed by forming a temporary group of the devices 412 and 428 and the third mobile device 416 to control or otherwise communicate with the IoT devices 404. If one or both of the devices 412, 428 are autonomous, the temporary group may provide instructions to the devices 412, 428. As the transient devices 412, 428, and 416, leave the vicinity of the fog device 420, it may reconfigure itself to eliminate those IoT devices from the network. The fog device 420 may also divide itself into functional units, such as the IoT devices 404 and other IoT devices proximate to a particular area or geographic feature, or other IoT devices that perform a particular function. This type of combination may enable the formation of larger IoT constructs using resources from the fog device 420.

As illustrated by the fog device 420, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

FIG. 5 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device (such as those discussed herein). Further, an IoT device may be a virtual device, such as an application on a smart phone or other computing device. IoT devices may include IoT gateways (e.g., GW 202 or the like), used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 4-6, present a number of new challenges in a heterogeneous network of connectivity comprising a combination of wired and wireless technologies.

FIG. 5 specifically provides a simplified drawing of a domain topology that may be used for a number of internet-of-things (IoT) networks comprising IoT devices 504 (which may correspond with the other IoT devices discussed herein), with the IoT networks 556, 558, 560, 562, coupled through backbone links 502 to respective gateways 554. For example, a number of IoT devices 104 may communicate with a gateway 554 and with each other through the gateway 554. To simplify the drawing, not every IoT device 504, or communications link (e.g., link 516, 522, 528, or 532) is labeled. The backbone links 502 may include any number of wired or wireless technologies, including optical networks, and may be part of a local area network (LAN), a wide area network (WAN), or the Internet. Additionally, such communication links facilitate optical signal paths among both IoT devices 504 and gateways 554, including the use of MUXing/deMUXing components that facilitate interconnection of the various devices. In some embodiments, one or more of the gateways 554 may correspond to an edge or Fog network appliance having components and/or functionality described with respect to the embodiments of gateway 220 of FIG. 2.

The network topology may include any number of types of IoT networks, such as a mesh network provided with the network 556 using Bluetooth low energy (BLE) links 522. Other types of IoT networks that may be present include a wireless local area network (WLAN) network 558 used to communicate with IoT devices 504 through IEEE 802.11 (Wi-Fi®) links 528, a cellular network 560 used to communicate with IoT devices 504 through an LTE/LTE-A (4G) or 5G cellular network, and a low-power wide area (LPWA) network 562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 504, such as over the backbone links 502, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 558, for instance, may use systems that perform standards conversion to provide multi-standard connectivity, enabling IoT devices 504 using different protocols to communicate. Further systems may provide seamless interconnectivity across a multi-standard infrastructure comprising visible Internet resources and hidden Internet resources.

Communications in the cellular network 560, for instance, may be enhanced by systems that offload data, extend communications to more remote devices, or both. The LPWA network 562 may include systems that perform non-Internet protocol (IP) to IP interconnections, addressing, and routing. Further, each of the IoT devices 504 may include the appropriate transceiver for wide area communications with that device. Further, each IoT device 504 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 6.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

FIG. 6 illustrates an environment 600 including a cloud computing network 601, or cloud 601, in communication with a number of Internet of Things (IoT) devices. The cloud 601 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 601 may be associated with network operator who owns or controls equipment and other elements necessary to provide network-related services, such as one or more base stations or access points, and one or more servers for routing digital data or telephone calls (for example, a core network or backbone network).

The IoT devices in environment 600 may be the same or similar to the IoT devices 104 and 404 discussed with regard to FIGS. 1 and 4, and may correspond with the managed client systems 230 discussed with regard to FIG. 2. The IoT devices may include any number of different types of devices, grouped in various combinations, such as IoT group 606 that includes various IoT devices that provide one or more services for a particular user, customer, organizations, etc. A service provider may deploy the IoT devices in the IoT group 606 to a particular area (e.g., a geolocation, building, etc.) in order to provide the one or more services. In one example, a traffic control group 606 may include IoT devices along streets in a city. These IoT devices may include stoplights, traffic flow monitors, cameras, weather sensors, and the like, to provide traffic control and traffic analytics services for a particular municipality or other like entity. The IoT group 606, or any of the IoT groups discussed herein, may include the components, devices, systems discussed with regard to FIGS. 2 and/or 7-8.

The traffic control group 606, or other subgroups, may be in communication with the cloud 601 through wired or wireless links 608, such as LPWA links, optical links, and the like. Further, a wired or wireless sub-network 612 may allow the IoT devices to communicate with each other, such as through a local area network, a wireless local area network, and the like. The IoT devices may use another device, such as a gateway 610 or 928 to communicate with remote locations such as the cloud 601; the IoT devices may also use one or more servers 930 to facilitate communication with the cloud 601 or with the gateway 610. For example, the one or more servers 630 may operate as an intermediate network node to support a local edge cloud or fog implementation among a local area network, and some of the one or more servers 630 may operate as an RMS 210 as discussed previously. Further, the gateway 628 that is depicted may operate in a cloud-to-gateway-to-many edge devices configuration, such as with the various IoT devices 614, 620, 624 being constrained or dynamic to an assignment and use of resources in the cloud 601. In some embodiments, one or more of the gateways 610 or 628 may correspond to an edge or Fog network appliance having components and/or functionality described with respect to network appliance 220 of FIG. 2. The one or more servers 604 may provide RMS 210 as described in connection with FIG. 2.

Other example groups of IoT devices may include remote weather stations 614, local information terminals 616, alarm systems 618, automated teller machines 620, alarm panels 622, or moving vehicles, such as emergency vehicles 624 or other vehicles 626, among many others. Each of these IoT devices may be in communication with other IoT devices, with servers 604, with another IoT fog device or system (not shown, but depicted in FIGS. 4 and/or 5), or a combination therein. The groups of IoT devices may be deployed in various residential, commercial, and industrial settings (including in both private or public environments).

As can be seen from FIG. 6, a large number of IoT devices may be communicating through the cloud 601. This may allow different IoT devices to request or provide information to other devices autonomously. For example, a group of IoT devices (e.g., the traffic control group 906) may request a current weather forecast from a group of remote weather stations 614, which may provide the forecast without human intervention. Further, an emergency vehicle 624 may be alerted by an automated teller machine 620 that a burglary is in progress. As the emergency vehicle 624 proceeds towards the automated teller machine 620, it may access the traffic control group 606 to request clearance to the location, for example, by lights turning red to block cross traffic at an intersection in sufficient time for the emergency vehicle 624 to have unimpeded access to the intersection.

In another example, the IoT group 606 may be an industrial control group (also referred to as a "connected factory", an "industry 4.0" group, and the like) where the IoT devices in the IoT group 606 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 606 may communicate with the servers 604 via GW 610 and cloud 601 to provide captured data, which may be used to provide performance monitoring and analytics to the manufacturer or factory operator. Additionally, the IoT devices in the IoT group 606 may communicate among each other, and/or with other IoT devices of other IoT groups, to make decisions on their own and to perform their tasks as autonomously as possible.

Clusters of IoT devices, such as the remote weather stations 614 or the traffic control group 906, may be equipped to communicate with other IoT devices as well as with the cloud 601. This may allow the IoT devices to form an ad-hoc network between the devices, allowing them to function as a single device, which may be termed a fog device or system (e.g., as described above with reference to FIGS. 4 and/or 5).

FIG. 7 illustrates an example of infrastructure equipment 700 in accordance with various embodiments. The infrastructure equipment 700 (or "system 700") may be implemented as network appliance 220 and/or a server providing an RMS 210 as shown and described previously, and include components corresponding to and/or implementing various components and methods described previously with regard to FIGS. 2-3. The system 700 may also be implemented as a cellular Radio Access Network (RAN) node, a Wi-Fi access point (e.g., a router, switch, hub, etc.), and/or any other element/device discussed herein. The system 700 may include one or more of application circuitry 705, baseband circuitry 710, one or more radio front end modules 715, memory 720, power management integrated circuitry (PMIC) 725, power tee circuitry 730, network controller 735, network interface connector 740, satellite positioning circuitry 745, and user interface 750. In some embodiments, the device 700 may include additional elements such as, for example, memory/storage, display, camera, sensor, or input/output (I/O) interface.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 705 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 705 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 700 may not utilize application circuitry 705, and instead may include a special-purpose processor/controller to operate according to the various embodiments herein. The processors of application circuitry 705 may be implemented as one or more integrated circuits, such as a System on Chip (SoC), System-in-Package (SiP), a multi-chip package (MCP), and/or the like.

The memory circuitry 720 includes one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), resistive memory such as magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards. The memory circuitry 720 may also comprise persistent storage devices, which may be temporal and/or persistent storage of any type, including, but not limited to, non-volatile memory, optical, magnetic, and/or solid state mass storage, and so forth. In embodiments, the memory circuitry 720 may be disposed in or on a same die or package as the application circuitry 705 (e.g., a same SoC, a same SiP, or soldered on a same MCP as the application circuitry 705).

The memory circuitry 720 may be employed to store a working copy and a permanent copy of the programming instructions, such as drivers, for the operation of various components of system 700, an operating system of system 700, and/or one or more applications, collectively referred to as "computational logic" or "modules". The various elements may be implemented by assembler instructions supported by one or more processor(s) or high-level languages that may be compiled into such instructions. The permanent copy of the programming instructions may be placed into persistent storage devices in the factory or in the field through, for example, a distribution medium (not shown), such as a compact disc (CD), or through communication interface (from a distribution server (not shown)), or over-the-air (OTA). That is, one or more distribution media having an implementation of the agent program may be employed to distribute the agent and to program various computing devices.

In embodiments, the memory circuitry 720 stores program code, computational logic, one or more modules, etc. to carry out embodiments discussed herein (such as one or more operations of FIGS. 3A-3D). For example, when the system 700 is implemented as the network appliance 220, the memory circuitry 720 may correspond with the local storage 255 and may store program code, computational logic, one or more modules, etc., which when executed by processor(s) of the application circuitry 705, is to cause the network interface circuitry (NIC) 735 to receive, from the RMS 210, an IDE redirection message for a client system 230 when the network appliance 220 is one hop away from the client system 230, wherein the IDE redirection message is to indicate an application to be provisioned in the client computer system; control storage of the application indicated by the IDE redirection message in the memory circuitry 720/local storage 255; and control provisioning of the application from the memory circuitry 720/local storage 255 to the client system 230 based on a provisioning instruction obtained from the RMS.

In another example, when the system 700 is implemented as a computer system (server) that provides the RMS 210, the memory circuitry 720 may store program code, computational logic, one or more modules, etc. of the failover module 215. One or more processor(s) of the application circuitry 705 may then invoke or execute the failover module 215 to control the NIC 735 to receive a CIRA packet from the client computer system 230, wherein the CIRA packet is to include a SHNAI that identifies a network appliance 220 device that is a one hop away from the client computer system 230; identify an application to be provisioned in the client computer system 230 (e.g., within the storage system 217); control communication of the application to the network appliance 220 device identified by the SHNAI for storage in the local storage 255 of the network appliance 220; and instruct the network appliance 220 device to provision the application in the client computer system 230. Controlling communication of the application to the network appliance 220 may include obtaining the application from the storage system 217 or instructing the network appliance 220 to obtain the application from a specified (physical or logical) location in the storage system 217.

In some embodiments, the memory circuitry 720 may store program code, computational logic, etc. of a data encoder or one or more coder-decoders (codecs), which when executed by one or more processors of the application circuitry 705 to encode/decode or transcode data in accordance with a Motion Picture Experts Group-2 (MPEG-2), H.264 Advanced Video Coding (H264/AVC), H.265 High Efficiency Coding (H265/HEVC), VP9, VC-1 or Motion JPEG (MJPEG) video compression standard or any other suitable video compression standard. In various embodiments, the memory circuitry 720 may store program code, computational logic, etc. of a cryptographic module, which when executed by one or more processors of the application circuitry 705 to encrypt CIRA packets for transmission or to decrypt received CIRA packets. The cryptographic module may be configured to encrypt or decrypt data in accordance with data encryption standard (DES), advanced encryption standard (AES), or any other suitable encryption standard, such as those discussed herein. In other implementations, the system 700 may include management engine circuitry or a secure cryptoprocessor to perform encryption/decryption, encoding/decoding, and/or other like tasks.

In embodiments where processor circuitry 702 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

Additionally or alternatively, at least one processor of the application circuitry 705 and/or the baseband circuitry 710 may be packaged together with a storage medium having all or portions of memory circuitry 720 configured to facilitate aspects of embodiments described herein, such as the program code/modules/computational logic discussed previously. In these implementations, application circuitry 705 may include circuitry such as, but not limited to, one or more a FPDs such as FPGAs, etc.; PLDs such as CPLDs, HCPLDs, etc.; ASICs such as structured ASICs and the like; PSoCs; and the like. The circuitry of application circuitry 705 comprises logic blocks or logic fabric including and other interconnected resources that may be programmed to perform various functions, such as the procedures, methods, functions, etc. of the various embodiments discussed herein, such as the program code/modules/computational logic discussed previously. The circuitry of application circuitry 705 may include memory cells (e.g., EPROM, EEPROM, flash memory, static memory (e.g., SRAM, anti-fuses, etc.) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

As used herein, the terms "instantiate", "instantiation", and the like may refer to the creation of an instance, and an "instance" may refer to a concrete occurrence of an object, which may occur, for example, during execution of program code.

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas. The RFEMs 715 may additionally or alternatively include other radio devices, such as infrared transceivers, short-range radio transceivers (e.g., Bluetooth, etc.), and so forth). The communication interfaces 610 may include communication chips (not shown) that may be configured to operate the computer device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (e.g., a "copper interconnect"), optical, or wireless. The physical connection also includes suitable input connectors (e.g., ports, receptacles, sockets, etc.) and output connectors (e.g., plugs, pins, etc.). The network controller circuitry 735 may include one or more dedicated processors and/or FPGAs to communicate using one or more of the aforementioned protocol. In some implementations, the network controller circuitry 735 may include multiple controllers to provide connectivity to other networks using the same or different protocols. In some embodiments, the network controller circuitry 735 may operate via one or more LAN ports and/or one or more WAN ports. In embodiments where system 700 is implemented in a NA apparatus 220 for remote management of a client system 230, the network controller circuitry 735 may comprise include one or more LAN interfaces (or ports) to receive CIRA packets from managed client systems 230 and various instructions from an RMS 210 to provision applications and/or operating systems to faulty ones of the managed client systems 230. The LAN interface is coupled (or communicatively coupled) to memory circuitry 720/local storage 255, and is used to receive the applications/operating systems to be provisioned in faulty client systems 230 for storage in the memory circuitry 720/local storage 255. The LAN interface is also used to provision the stored applications/operating systems from the memory circuitry 720/local storage 255 to the faulty client system 230.

User interface circuitry 750 may include one or more user interfaces designed to enable user interaction with the system 700 or peripheral component interfaces designed to enable peripheral component interaction with the system 700. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The positioning circuitry 745, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes. Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 745 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 745 may include a Micro-Technology for Positioning, Navigation, and Timing (Micro-PNT) IC that uses a master timing clock to perform position tracking/estimation without GNSS assistance. The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 745 may provide data to application circuitry 705 which may include one or more of position data or time data. Application circuitry 705 may use the time data to synchronize operations with other radio base stations.

The components shown by FIG. 7 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an $I^2C$ interface, an SPI interface, point to point interfaces, and a power bus, among others.

FIG. 8 illustrates an example of a platform 800 (or "device 800") in accordance with various embodiments. The computer platform 800 may be suitable for use as managed client systems 230 and/or IoT devices 104/404. Platform 800 may also be implemented in or as a server computer system or some other element, device, or system discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 9 is intended to show a high level view of components of the computer platform 800. However, some of the components shown may be omitted, additional components may be present, and different arrangement of the components shown may occur in other implementations.

The platform 800 includes processor circuitry 802. The processor circuitry includes circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC)

or similar, universal serial bus (USB) interfaces, mobile industry processor interface (MIPI) interfaces and Joint Test Access Group (JTAG) test access ports. The processor(s) of processor circuitry 802 may include any combination of general-purpose processors and/or dedicated processors (e.g., graphics processors (GPUs), application processors, etc.), which may be microprocessor(s), multi-core processor(s), multithreaded processor(s), an ultra-low voltage processor(s), embedded processor(s), or other known processing element. The processors (or cores) of the processor circuitry 802 may be coupled with or may include memory/storage and may be configured to execute instructions stored in the memory/storage to enable various applications or operating systems to run on the platform 800.

As an example, the processor circuitry 802 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as one or more of Advanced Micro Devices (AMD) Ryzen® processor(s), Accelerated Processing Units (APUs), MxGPUs, or the like; A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the processor circuitry 802 may be a part of a system on a chip (SoC) in which the processor circuitry 802 and other components are formed into a single integrated circuit, or a single package, such as the Edison™ or Galileo™ SoC boards from Intel® Corporation.

Additionally or alternatively, processor circuitry 802 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 802 may comprise logic blocks or logic fabric including and other interconnected resources that may be programmed to perform various functions, such as the procedures, methods, functions, etc. of the various embodiments discussed herein. In such embodiments, the circuitry of processor circuitry 802 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 802 may communicate with a system memory circuitry 804 over an interconnect 806 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage circuitry 808 may also couple to the processor circuitry 802 via the interconnect 806. In an example, the storage circuitry 808 may be implemented via a solid-state disk drive (SSDD). Other devices that may be used for the storage circuitry 808 include flash memory cards, such as SD cards, microSD cards, xD picture cards, and the like, and USB flash drives. In low power implementations, the storage circuitry 808 may be on-die memory or registers associated with the processor circuitry 802. However, in some examples, the storage circuitry 808 may be implemented using a micro hard disk drive (HDD). Further, any number of new technologies may be used for the storage circuitry 808 in addition to, or instead of, the technologies described, such resistance change memories, phase change memories, holographic memories, or chemical memories, among others.

The memory circuitry 804 and/or storage circuitry 808 may store program code of an operating system (OS), which may be a general purpose OS or an OS specifically written for and tailored to the computing platform 800. The OSs may include one or more drivers that operate to control particular devices that are embedded in the platform 800, attached to the platform 800, or otherwise communicatively coupled with the platform 800. The drivers may include individual drivers allowing other components of the platform 800 to interact or control various input/output (I/O) devices that may be present within, or connected to, the platform 800. For example, the drivers may include a display driver to control and allow access to a display device, a touchscreen driver to control and allow access to a touchscreen interface of the platform 800, sensor drivers to obtain sensor readings of sensor circuitry 822 and control and allow access to sensor circuitry 822, EMC drivers to obtain actuator positions of the EMCs 822 and/or control and allow access to the EMCs 822, a camera driver to control and allow access to an embedded image capture device, audio drivers to control and allow access to one or more audio devices. The OSs may also include one or more libraries, drivers, or APIs, which provide program code and/or software components for one or more applications to obtain and use the data from the secure execution environment (SEE) 715 and/or the ME circuitry 850. The SEE 815, the ME circuitry 850, or both the SEE 815 and ME circuitry 850 may be referred to as a trusted execution environment (TEE) and the like.

In this example, the storage circuitry 808 is divided into one or more trusted memory regions 817 for storing applications or software modules of the SEE 815. In other embodiments, the trusted memory regions may be included in the memory circuitry 804, or any combination of the memory circuitry 804 and the storage circuitry 808. The trusted memory regions are hardware enforceable containers called "enclaves," "secure enclaves," and the like. The enclaves 817 are one or more isolated regions of the storage circuitry 808 that are encrypted within the storage circuitry 808, and only decrypted inside a secure region of the processor circuitry 802. The secure enclaves 817 may be used to store security critical code and/or data, such as secure applications (not shown) and/or an enclave OS (not shown). The storage circuitry 808 may be divided into multiple enclaves 817, wherein each enclave may include its own applications and/or data. From a physical point of view, enclave data is resident within registers, caches, and/or other logic blocks inside the application circuitry or host architecture (e.g., processor circuitry 802, memory circuitry 804, storage circuitry 808, etc.). Unauthorized access via untrusted software is prevented by processor logic. Whenever enclave data leaves the on-package caches to be written to memory circuitry 804 and/or storage circuitry 808, the data is automatically encrypted and integrity protected, which reduces the likelihood enclave data will be viewed, modified, or replayed. In some embodiments, the enclaves may be defined and managed by a virtual machine monitor (VMM) of a virtual machine running as a guest OS. Any suitable VMM may be used to define the secure enclaves. In various embodiments, the SEE 815 may be one or more secure enclaves defined using the Intel® SGX instructions. A detailed discussion of enclave establishment and operation (including communication between two or more enclaves, and between an enclave and remote devices) is discussed in the commonly assigned Int'l App. No. PCT/US2016/037634 and U.S. application Ser. No. 15/473,370, both of which are incorporated by reference in their entireties. Other examples of the SEE 815 may include, inter alia, AMD® Secure Execution Environment, ARM® TrustZone® virtual processor(s), AMD® secure virtual machine, Qualcomm® Secure Execution Environment (QSEE), TSEE provided by Trust-Kernel®, Kinibi provided by Trustsonic®, and/or the like. According to various embodiments, one or more enclaves 817 may be used as the management controller 231 as shown and described with regard to FIG. 2.

The storage circuitry 808 may include instructions 882 in the form of software, firmware, or hardware commands to implement the techniques described herein. Although such instructions 882 are shown as code blocks included in the memory circuitry 804 and the storage circuitry 808, it may be understood that any of the code blocks may be replaced with hardwired circuits, for example, built into an application specific integrated circuit (ASIC).

In an example, the instructions 882/870 provided via the memory circuitry 804, the storage circuitry 808, or the processor circuitry 802 may be embodied as a non-transitory, machine-readable medium 860 including code to direct the processor circuitry 802 to perform electronic operations in the platform 800. The processor circuitry 802 may access the non-transitory, machine-readable medium 860 over the interconnect 806. For instance, the non-transitory, machine-readable medium 860 may be embodied by devices described for the storage circuitry 808 of FIG. 8 or may include specific storage units such as optical disks, flash drives, or any number of other hardware devices. The non-transitory, machine-readable medium 860 may include instructions 882 to direct the processor circuitry 802 to perform a specific sequence or flow of actions, for example, as described with respect to the flowchart(s) and block diagram(s) of operations and functionality depicted previously. In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The components may communicate over the interconnect 806. The interconnect 806 may include any number of technologies, including industry standard architecture (ISA), extended ISA (EISA), peripheral component interconnect (PCI), peripheral component interconnect extended (PCIx), PCI express (PCIe), or any number of other technologies. The interconnect 806 may be a proprietary bus, for example, used in a SoC based system. Other bus systems may be included, such as an I$^2$C interface, an SPI interface, point-to-point interfaces, and a power bus, among others.

The interconnect 806 couples the processor circuitry 802 to a modem circuitry 810 (also referred to as "baseband circuitry 810", "modem 810", and the like) for communications with other devices. The modem 810 comprises one or more memory devices and one or more processors (e.g., baseband processors) used to perform various operations to communicate in accordance with one or more wireless communications protocols (e.g., where each processor is dedicated implement a particular protocol stack of a corresponding wireless protocol), one or more audio digital signal processor(s) (DSP) including elements for compression/decompression and echo cancellation, and may include other suitable processing elements in other embodiments. The processors of the modem 810 may be the same or similar to the processor circuitry 802 discussed previously. In various embodiments, modem 810 may interface with the application circuitry of the computing platform 800 (e.g., processor circuitry 802, memory circuitry 804, and storage circuitry 808) for generation and processing of the signals and for controlling operations of the transceivers 811, 812.

The modem 810 may process signals received from receive signal paths of the transceivers 811, 812 and generate signals for transmit signal paths of the transceivers 811, 812. The modem 810 may be used to handle various radio control functions that enable communication with one or more radio networks via the transceivers 811, 812 according to one or more particular wireless communications protocols. The radio control functions may include, but are not limited to, signal modulation/demodulation, encoding/decoding, radio frequency shifting, implementing protocol stacks, and the like. In some embodiments, modulation/demodulation by the modem 810 may include Fast-Fourier Transform (FFT), precoding, and/or constellation mapping/demapping functionality. In some embodiments, encoding/decoding circuitry of the modem 810 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. The modem 810 may pass demodulated signals obtained from the transceivers 811, 812 to other components of the computing platform 800, and may pass modulated signals to the transceivers 811, 812 for transmission to other devices.

The transceiver 811 (also referred to as a "mesh transceiver" and the like) is used for communications with other mesh devices 864. The mesh transceiver 811 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, for example, according to a cellular or other wireless wide area protocol, may occur via a WWAN unit.

The mesh transceiver 811 may communicate using multiple standards or radios (e.g., including hardware devices such as switches, filters, amplifiers, antenna elements, and the like to facilitate the communications over the air) for communications at different range. For example, the platform 800 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 812 (also referred to as a "cloud transceiver" and the like) may be included to communicate with devices or services in the cloud 801 via local or wide area network protocols. The wireless network transceiver 812 includes one or more radios (e.g., including hardware devices such as switches, filters, amplifiers, antenna elements, and the like to facilitate the communications over the air) to communicate with devices in the cloud 801. The cloud 801 may be the same or similar to cloud 401 of FIG. 4 and/or cloud 601 of FIG. 6. The wireless network transceiver 812 may be a LPWA transceiver that follows the IEEE 802.15.4, or IEEE 802.15.4g standards, among others. The platform 800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 811 and wireless network transceiver 812, as described herein. For example, the radio transceivers 811 and 812 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The radio transceivers 811 and 812 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, IS100.11a, etc.) WiFi-direct, ANT/ANT+, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.1 lay, etc.), technologies operating above 300 GHz and THz bands, (3GPP/LTE based or IEEE 802.11p and other) Vehicle-to- Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 811, 812 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface circuitry/controller (NIC) 816 may be included to provide a wired communication to the cloud 801 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 816 may be included to allow connect to a second network, for example, a NIC 816 providing communications to the cloud over Ethernet, and a second NIC 816 providing communications to other devices over another type of network. The NIC 816 comprises one or more dedicated processors and/or FPGAs to communicate using one or more of the aforementioned protocols. In some implementations, the NIC 816 may include multiple controllers to provide connectivity to other networks using the same or different protocols.

The interconnect 806 may couple the processor circuitry 802 to an external interface 818 (also referred to as "I/O interface circuitry" or the like) that is used to connect external devices or subsystems. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. In some implementations, the interface circuitry 818 may connect the platform 800 with positioning circuitry 845, which may be the same or similar as the positioning circuitry 745 discussed with regard to FIG. 7. The external devices may include sensor circuitry 822, such as accelerometers, level sensors, flow sensors, optical light sensors, camera sensors, temperature sensors, pressure sensors, barometric pressure sensors, and the like. The external interface 818 connects the platform 800 to electro-mechanical devices (EMCs) 824, allow platform 800 to change its state, position, and/or orientation, or move or control a mechanism or system. The EMCs 822 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 may be configured to operate one or more EMCs 822 based on one or more captured events and/or instructions or control signals received from a service provider and/or various client systems. In some embodiments, the aforementioned sensor circuitry 822 and EMCs 824 may correspond to the sensors 428 discussed with regard to FIG. 4. In other embodiments, the platform 800 that utilizes the sensor circuitry 822 and EMCs 824 may correspond to the sensors 428 discussed with regard to FIG. 4.

The ME circuitry 850 is one or more hardware and/or software components used to remotely manage the platform 800, and to establish that the platform 800 is using or includes trustworthy components to ensure the integrity of other parts of the platform 800. The ME circuitry 850 may be embodied as any number of hardware, firmware, and/or software modules configured to perform security, encryption, and/or authentication functions, as described herein. In some implementations, the ME circuitry 850 may be an physically isolated and tamper-resistant chipset, which is distinct from and generally operates independently of the processor circuitry 802. In other implementations, the isolation of the ME circuitry 850 can be realized using secure processor modes, virtualization (e.g., using a virtual machine), or containerization (e.g., using an application container, such as Docker® containers). In embodiments where the ME circuitry 850 is implemented as a separate chipset, the ME circuitry 850 may be included in a graphics controller or graphics processing unit (GPU), integrated into the application circuitry (e.g., a same circuit board or package as processor circuitry 802 and/or memory circuitry 804, etc.), or integrated into the communication circuitry of the platform 800 (e.g., a same circuit board, SoC, SiP, etc. as the modem circuitry 810 or the NIC 816). In other embodiments, the ME circuitry 850 may additionally or alternatively include separate circuitry disposed on another circuit board, SoC, package, SiP, etc. that is communicatively coupled to the application circuitry and/or the communication circuitry via a signal path, such as interconnect 806 or a separate bus (e.g., a private LPC bus/interconnect). In some implementations, the ME circuitry 850 may be communicatively coupled the application circuitry, communications circuitry, and/or other components of the platform 800 via interconnect 806 or via one or more separate bus/interconnects, such as a private low pin count (LPC) serial bus or some other bus or interconnect that is not exposed to a host OS of the application circuitry.

In this example, the ME circuitry 850 includes ME processor 852 and ME memory 854. ME memory 854 is a mechanism that provides secure storage of certain data and disallows unauthorized access by other untrusted components of the platform 800. The ME circuitry 854 stores various crypto operations, which is a set of cryptographic algorithms or operations used for generating keys and encrypting/decrypting data. The keys may be used to encrypt/decrypt data being communicated through the ME circuitry 850. In some embodiments, the keys may be generated based on one or more measurements of the application circuitry. However, any suitable algorithm or operations may be used for key generation and/or encrypting/decrypting data. The ME memory 854 also stores program code/computational logic of an ME operating system, firmware, or the like, for authenticating and verifying trusted components to access to securely stored data, and for preventing unauthorized or untrusted components from accessing the securely stored data. ME processor 852 comprises one or more processing devices capable of executing software modules or program code independently of the other processors of the application circuitry and may include tamper-resistant characteristics. ME processor 852 may include one or more microprocessors, DSPs, cryptoprocessors, secure cryptoprocessors, cryptographic accelerators, secure controllers, and/or any other suitable device. The ME memory 854 may be embodied as one or more volatile and/or non-volatile memory devices. The ME memory 854 may store various data, including software/firmware executable by the ME processor 852 and data used for the various cryptographic operations, program code for an ME OS (not shown), keys, and crypto operations, and/or the like. In one example, a software or firmware component called a "management layer", when executed by the ME processor 852, provides a runtime environment for trusted applications or components, and enforces access control to protected resources (e.g., the aforementioned keys). The integrity of the management layer may be verified either as part of the boot time platform integrity verification (and runtime monitoring) or on demand when trusted applications are loaded for execution.

ME processor 852 may implement an ME OS, which may be a framework that provides OS like functionality to trusted applications, and provides an API for client applications to access trusted applications. The ME OS may also include internal ME APIs or libraries, such as a cryptographic operations API to provide cryptographic capabilities (e.g., the cryptographic algorithms/operations of crypto operations) to trusted applications, a trusted storage API to provide trusted storage for keys and other data, and a secure element API that provides mechanisms for an application to open a connection with a secure element. In some embodiments, the ME OS may also include firmware or drivers that provide override mechanisms for tamper-resistant hardware devices, and firmware or drivers for verifying digital certificates, etc. These firmware modules may ensure that various conditions are met before any new applications are provisioned within the ME circuitry 850. In some embodiments, the ME OS may include firmware modules for signing and verifying certificates using a certificate signing key pair. The firmware modules may verify a digital signature of certificates using a public key of the certificate signing key pair, and the private key of the certificate signing key pair is used by the security assist server to sign the certificates. The private key of this key pair may be stored in a secure data store associated with a remote provisioning service, and the public key of the key pair may be maintained in ME memory 754 as a firmware image that cannot be changed or altered (e.g., as one of the keys). In some embodiments, the ME OS may be any suitable OS or firmware, such as a real-time OS (RTOS) and the like.

According to various embodiments, the ME circuitry 850 may enable remote management of the platform 800 by RMS 210. In such embodiments, the RMS 210 may communicate with the platform 800 via a secure and/or encrypted link or channel with the ME circuitry 850 that is separate from the communications channels used by the application circuitry. The link with the ME circuitry 850 may secured using Transport Layer Security (TLS). This may be referred to as "out-of-band" management because the secure channel/link is outside of the normal communications link that the platform 800 uses to communicate with other devices or systems.

In embodiments, the ME circuitry 850 may operate in accordance with the International Organization for Standardization (ISO) and International Electrotechnical Commission (IEC) specification ISO/IEC 11889:2009, which defines standards for trusted computing platforms. In embodiments, the ME circuitry 850 may be a Desktop and mobile Architecture Hardware (DASH) compliant Network Interface Card (NIC), a Management/Manageability Engine provided by Intel®, a Converged Security Engine (CSE) or a Converged Security Management/Manageability Engine (CSME) provided by Intel®; Trusted Execution Engine (TXE) provided by Intel®, AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. The ME circuitry 850 may operate in conjunction with AMD® Secure Technology, AMD®-V, Trusted Execution Technology (TXT) provided by Intel®, Active Management Technology (AMT) provided by Intel® and/or Intel® vPro™ Technology (vPro). The Intel® AMT and/or Intel® vPro™ may allow for remote provisioning of the ME circuitry 850, and remote management of the ME circuitry 850 once the ME circuitry 850 has been successfully provisioned.

In some optional examples, various input/output (I/O) devices may be present within, or connected to, the platform 800. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the platform 800. In another example, near-field communication (NFC) circuitry comprising an NFC controller coupled with an antenna element and a processing device may be included to read electronic tags and/or connect with another NFC-enabled device.

A battery 826 may power the platform 800, although in examples in which the platform 800 is mounted in a fixed location, it may have a power supply coupled to an electrical grid. The battery 826 may be a lithium ion battery, or a metal-air battery, such as a zinc-air battery, an aluminum-air battery, a lithium-air battery, and the like.

A battery monitor/charger 828 may be included in the platform 800 to track the state of charge (SoCh) of the battery 826. The battery monitor/charger 828 may be used to monitor other parameters of the battery 826 to provide failure predictions, such as the state of health (SoH) and the state of function (SoF) of the battery 826. The battery monitor/charger 828 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 828 may communicate the information on the battery 826 to the processor circuitry 802 over the interconnect 806. The battery monitor/charger 828 may also include an analog-to-digital (ADC) convertor that allows the processor circuitry 802 to directly monitor the voltage of the battery 826 or the current flow from the battery 826. The battery parameters may be used to determine actions that the platform 800 may perform, such as transmission frequency, mesh network operation, sensing frequency, and the like.

A power block 828, or other power supply coupled to a grid, may be coupled with the battery monitor/charger 828 to charge the battery 826. In some examples, the power block 828 may be replaced with a wireless power receiver to obtain the power wirelessly, for example, through a loop antenna in the platform 800. A wireless battery charging circuit, such as an LTC4020 chip from Linear Technologies of Milpitas, Calif., among others, may be included in the battery monitor/charger 828. The specific charging circuits chosen depend on the size of the battery 826, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Input device circuitry 886 and output device circuitry 884 may include one or more user interfaces designed to enable user interaction with the platform 800 and/or peripheral component interfaces designed to enable peripheral component interaction with the platform 800. Input device circuitry 886 may include, inter alia, one or more physical or virtual buttons (e.g., a reset button), a physical keyboard or keypad, a mouse, a touchpad, a touchscreen, microphones, a scanner, a headset, and the like. The output device circuitry 884 may include, but are not limited to one or more indicators (e.g., light emitting diodes (LEDs)), speakers or other audio emitting devices, a printer, a display screen, display device (or a touchscreen), a projector, etc. In some embodiments, the sensor circuitry 822 may be used as the input device circuitry 886 (e.g., an image capture device, motion capture device, or the like) and one or more EMCs 824 may be used as the output device circuitry 884 (e.g., an actuator to provide haptic feedback or the like). Peripheral component interfaces may include, but are not limited to, a non-volatile memory port, a universal serial bus (USB) port, an audio jack, a power supply interface, etc.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Some non-limiting examples are as follows. The following examples pertain to further embodiments, and specifics in the examples may be used anywhere in one or more embodiments discussed previously. Any of the following examples may be combined with any other example, or any embodiment discussed herein, unless explicitly stated otherwise.

Example 1 includes an apparatus to be employed as a network appliance (NA), the apparatus comprising: network interface circuitry (NIC) configured to receive, from a remote management service (RMS), an IDE redirection message for a client computer system when the NA is one hop away from the client computer system, wherein the IDE redirection message is to indicate an application to be provisioned in the client computer system; and processor circuitry communicatively coupled with memory circuitry and the NIC, the processor circuitry configured to: control storage of the application indicated by the IDE redirection message in the memory circuitry, and control provisioning of the application from the memory circuitry to the client computer system based on a provisioning instruction obtained from the RMS.

Example 2 includes the apparatus of example 1 and/or some other example(s) herein, wherein: the NIC is configured to receive a network packet from the client computer system, and send an updated version of the network packet to the RMS; and the processor circuitry is configured to: inspect a header portion of the network packet to identify a client initiated remote access (CIRA) packet within the network packet, set a failover capability field of the CIRA packet to indicate that the NA supports provisioning of the application via IDE redirection, and insert a single hop NA identifier (SHNAI) into the CIRA packet to obtain the updated version of the network packet, wherein the SHNAI is to identify the NA as being one hop away from the client computer system.

Example 3 includes the apparatus of example 2 and/or some other example(s) herein, wherein the processor circuitry is configured to inspect the header portion when the network packet indicates that a destination port of the network packet is an RMS port.

Example 4 includes the apparatus of example 1 and/or some other example(s) herein, wherein: the NIC is configured to receive a first network packet from the RMS, wherein the first network packet is to include a query for an SHNAI of the NA, and send a second network packet to the RMS; and the processor circuitry is configured to generate the second network packet to include the SHNAI of the NA and a failover capability of the NA, wherein the SHNAI is to identify the NA and the SHNAI is to indicate that the NA is one hop away from the client computer system, and wherein the failover capability value is to indicate that the NA supports provisioning of the application in the client computer device via IDE redirection.

Example 5 includes the apparatus of example 1 and/or some other example(s) herein, wherein: the NIC is configured to receive a Dynamic Host Configuration Protocol (DHCP) offer message from the client computer system during a DHCP connectivity handshake procedure, and send a DHCP offer message to the client computer system in response to the DHCP offer message; and the processor circuitry is configured to generate the DHCP offer message to include an internet protocol (IP) address to be assigned to the client computer system and an SHNAI of the NA, wherein the SHNAI is to identify the NA and the SHNAI is to indicate that the NA is one hop away from the client computer system.

Example 6 includes the apparatus of examples 1-5 and/or some other example(s) herein, wherein the application is an operating system of the client computer system.

Example 7.0 includes the apparatus of examples 1-6 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 7.5 includes the apparatus of examples 1-7.0 and/or some other example(s) herein, wherein the NA is a gateway device comprising a plurality of gateway functions, wherein the plurality of gateway functions comprise one gateway function to be operated by the processor circuitry to control the storage of the application indicated by the IDE redirection message in the memory circuitry and control the provisioning of the application from the memory circuitry to the client computer system based on a provisioning instruction obtained from the RMS.

Example 8 includes one or more computer-readable media (CRM) comprising instructions, wherein execution of the instructions by one or more processors of a remote management service (RMS) computer system is to cause the RMS computer system to: control receipt of a client initiated remote access (CIRA) packet from a client computer system that is managed by the RMS, wherein the CIRA packet is to include a single hop NA identifier (SHNAI), and wherein the SHNAI is to identify a NA that is a one hop away from the client computer system; identify an application to be provisioned in the client computer system; control transmission of the application to the NA identified by the SHNAI for storage by the NA; and instruct the NA to provision the application in the client computer system.

Example 9 includes the one or more CRM of example 8 and/or some other example(s) herein, wherein the CIRA packet is to include client configuration information, and wherein execution of the instructions is to cause the RMS computer system to: inspect the client configuration information in the CIRA packet to identify the application to be provisioned in the client computer system.

Example 10 includes the one or more CRM of example 9 and/or some other example(s) herein, wherein the application is an operating system (OS) bootable disk partition or an OS image based on OS information indicated by the client configuration information.

Example 11 includes the one or more CRM of examples 9-10 and/or some other example(s) herein, wherein execution of the instructions is to cause the RMS computer system to: identify a first location of the application in a network attached storage (NAS) system; and copy the application from the first location to a second location, wherein the second location is in a local storage of the NA.

Example 12 includes the one or more CRM of examples 8-11 and/or some other example(s) herein, wherein, to instruct the NA to provision the application in the client computer system, execution of the instructions is to cause the RMS computer system to: control transmission of a message to the client computer system, wherein the message is to include another instruction to instruct the client computer system to perform an IDE redirection to the NA.

Example 13 includes the one or more CRM of examples 8-12 and/or some other example(s) herein, wherein execution of the instructions is to cause the RMS computer system to: control receipt of a first indication to indicate that the application has been successfully provisioned in the client computer system; to generate a second indication in response to receipt of the first indication, wherein the second indication is to instruct the client computer system to load one or more other applications upon provisioning of the application; and control transmission of the second indication to the client computer system.

Example 14 includes the one or more CRM of examples 8-13 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 15 includes the one or more CRM of examples 8-14 and/or some other example(s) herein, wherein the RMS computer system is employed by a cloud computing service, wherein the NA is an edge NA or a fog NA that is deployed in a fog computing system, and wherein the client computer system is implemented in an Internet of Things (IoT) device.

Example 16 includes a system comprising: a remote management service (RMS); a single hop NA; and one or more managed client computer systems, wherein: the RMS is configured to identify an application to be provisioned in a client computer system based on a received client initiated remote access (CIRA) packet, provide the application to a single hop NA for storage by the a single hop NA; the single hop NA is configured to obtain the application from the RMS, store the application in a local storage of the single hop NA, and provision the application in a faulty client computer system of the one or more managed client computer systems; and the faulty client computer system is configured to detect a hardware or software fault; generate, in response to the detection, the CIRA packet to include a single hop NA identifier (SHNAI) field to include an SHNAI of the single hop NA and a failover capability field to include a failover capability of the faulty client computer system, transmit the generated CIRA packet to the RMS; and receive one or more data packets from the single hop NA for provisioning an application from the local storage of the single hop NA.

Example 17 includes the system of example 16 and/or some other example(s) herein, wherein the faulty client computer system is configured to: transmit a first network packet to the NA, wherein a header portion of the first network packet is to include the generated CIRA packet; and receive a second network packet from the NA, wherein the second network packet is to include an updated CIRA packet, wherein the updated CIRA packet is to include a SHNAI of the NA in the SHNAI field and a failover capability in the failover capability field, wherein the SHNAI is to identify the NA and indicate that the NA is a single hop from the client computer system, and wherein the failover capability is to indicate that the NA supports redirection of the client computer system for provisioning from a local storage of the NA, and the failover capability is to indicate that the client computer system supports redirection of the client computer system for provisioning from the local storage of the NA.

Example 18 includes the system of example 17 and/or some other example(s) herein, wherein a destination port in the first network packet is to indicate an RMS port.

Example 19 includes the system of examples 16-18 and/or some other example(s) herein, wherein the faulty client computer system is configured to: transmit a first network packet to the NA, wherein a body portion of the first network packet is to include a query for an SHNAI of the NA; generate the CIRA packet to include the SHNAI of the NA in the SHNAI field and a failover capability in the failover capability field, wherein the SHNAI is to identify the NA and indicate that the NA is one hop away from the client computer system, and wherein the failover capability is to indicate that the client computer system supports provisioning of the application in the client computer device via IDE redirection to the NA; and receive a second network packet from the NA, wherein the second network packet is to include the SHNAI of the NA.

Example 20 includes the system of examples 16-19 and/or some other example(s) herein, wherein the faulty client computer system is configured to establish a network connection with the NA, and wherein, to establish the network connection with the NA, the faulty client computer system is configured to: transmit a network establishment request message to the single hop NA; receive a network establishment response message from the single hop NA, wherein the network establishment response message is to include an SHNAI of the single hop NA, wherein the SHNAI is to identify the single hop NA and indicate that the single hop NA is one hop away from the faulty client computer system; store the SHNAI in a secure storage of the faulty client computer system; and generate the CIRA packet to include the SHNAI of the NA in the SHNAI field and to include a failover capability in the failover capability field, wherein the failover capability is to indicate that the faulty client computer system supports provisioning of the application in the client computer device via IDE redirection to the NA.

Example 21 includes the system of example 20, wherein the network establishment request message is a Dynamic Host Configuration Protocol (DHCP) discovery message or a DHCP request message, and the network establishment response message is a DHCP offer message when the network establishment request message is the DCHP discovery message or the network establishment response message is a DHCP acknowledgement message when the network establishment request message is the DCHP request message, wherein the DHCP offer message or the DHCP acknowledgement message is to include an internet protocol (IP) address to be assigned to the client computer system and the SHNAI of the single hop NA.

Example 22 includes the system of examples 16-21, wherein the faulty client computer system is configured to generate the CIRA packet to include client configuration information of the faulty client computer system, wherein the client configuration information is to indicate the application to be provisioned in the faulty client computer system when a fault is detected at the faulty client computer system.

Example 23 includes the system of example 22, wherein the application is an operating system (OS) bootable disk partition or an OS image based on OS information indicated by the client configuration information.

Example 24 includes the system of example 23, wherein the faulty client computer system comprises management engine (ME) circuitry to manage the redirection, wherein the ME circuitry is configured to: receive a first instruction from the RMS over a first end-to-end encrypted tunnel (EET) via the communication circuitry, wherein the first instruction is to instruct the ME circuitry to perform an IDE redirection procedure with the NA to provision the operating system from the local storage of the NA; establish, based on the first instruction, a second EET with the NA via the communication circuitry; receive one or more data packets from the NA over the second EET, wherein the one or more data packets comprise data for installation of the operating system at the client computer system; and receive a second instruction from the RMS over the first EET in response to successful installation of the operating system, wherein the second instruction is to instruct the client computer system to load one or more other applications from the local storage via the NA.

Example 25 includes the system of examples 16,-24 wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 26 includes an apparatus to provide a remote management service (RMS) for a client computer system, the apparatus comprising: network interface circuitry (NIC) configured to receive a client initiated remote access (CIRA) packet from the client computer system, wherein the CIRA packet is to include a single hop NA identifier (SHNAI), wherein the SHNAI is to identify a NA that is a one hop away from the client computer system; and processor circuitry coupled with the NIC, the processor circuitry configured to operate the RMS to: identify an application to be provisioned in the client computer system; send the application to the NA identified by the SHNAI for storage by the NA; and instruct the NA to provision the application in the client computer system.

Example 27 includes the apparatus of example 26 and/or some other example(s) herein, wherein the CIRA packet is to include client configuration information, and wherein the processor circuitry is configured to: inspect the client configuration information in the CIRA packet to identify the application to be provisioned in the client computer system.

Example 28 includes the apparatus of example 27 and/or some other example(s) herein, wherein the application is an operating system indicated by the client configuration information.

Example 29 includes the apparatus of examples 27-28 and/or some other example(s) herein, wherein the processor circuitry is configured to: identify a first location of the application in a network attached storage (NAS) system; and copy the application from the first location to a second location, wherein the second location is in memory circuitry of the NA.

Example 30 includes the apparatus of examples 26-29 and/or some other example(s) herein, wherein, to instruct the NA to provision the application in the client computer system, the processor circuitry is configured to: control the network interface circuitry to transmit a message to the client computer system, wherein the message is to include another instruction to instruct the client computer system to perform an IDE redirection to the NA.

Example 31 includes the apparatus of examples 26-30 and/or some other example(s) herein, wherein: the NIC is configured to receive a first indication to indicate that the application has been successfully provisioned in the client computer system, and transmit a second indication to the client computer system to instruct the client computer system to load one or more other applications upon provisioning of the application; and the processor circuitry is configured to generate the second indication in response to receipt of the first indication.

Example 32 includes the apparatus of examples 26-31 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 33 includes the apparatus of examples 26-32 and/or some other example(s) herein, wherein the apparatus is implemented in a computer system employed by a cloud computing service, wherein the NA is an edge NA or a fog NA that is deployed in a fog computing system, and wherein the client computer system is implemented in an Internet of Things (IoT) device.

Example 34 includes a client computer system comprising: management engine (ME) circuitry configured to manage redirection of the client computer system to be provisioned from a remote disk partition when a fault is detected at the client computer system; and processor circuitry communicatively coupled with memory circuitry and the ME circuitry, the processor circuitry configured to: detect a hardware or software failure of the client computer system, and generate, in response to the detection, a client initiated remote access (CIRA) packet comprising a single hop NA identifier (SHNAI) field and a failover capability field; and communication circuitry configured to transmit the generated CIRA packet to a remote management service (RMS), and receive one or more data packets from a NA associated with the SHNAI for provisioning an application from the remote disk partition.

Example 35 includes the client computer system of example 34 and/or some other example(s) herein, wherein the communication circuitry is configured to: transmit a first network packet to the NA, wherein a header portion of the first network packet is to include the generated CIRA packet; and receive a second network packet from the NA, wherein the second network packet is to include an updated CIRA packet, wherein the updated CIRA packet is to include a SHNAI of the NA in the SHNAI field and a failover capability in the failover capability field, wherein the SHNAI is to identify the NA and indicate that the NA is a single hop from the client computer system, and wherein the failover capability is to indicate that the NA supports redirection of the client computer system for provisioning from a remote disk partition, and the failover capability is to indicate that the ME circuitry supports redirection of the client computer system for provisioning from a remote disk partition.

Example 36 includes the client computer system of example 35 and/or some other example(s) herein, wherein a destination port in the first network packet is to indicate an RMS port.

Example 37 includes the client computer system of example 34 and/or some other example(s) herein, wherein: the communication circuitry is configured to: transmit a first network packet to the NA, wherein a body portion of the first network packet is to include a query for an SHNAI of the NA; and receive a second network packet from the NA, wherein the second network packet is to include the SHNAI of the NA; and the processor circuitry is configured to generate the CIRA packet to include the SHNAI of the NA in the SHNAI field and a failover capability in the failover capability field, wherein the SHNAI is to identify the NA and indicate that the NA is one hop away from the client computer system, and wherein the failover capability is to indicate that the ME circuitry supports provisioning of the application in the client computer device via IDE redirection to the NA.

Example 38 includes the client computer system of example 34 and/or some other example(s) herein, wherein the processor circuitry is configured to establish a network connection with the NA, and wherein, to establish the network connection with the NA, the processor circuitry is configured to: control the communication circuitry to transmit a network establishment request message to the NA; control the communication circuitry to receive a network establishment response message from the NA, wherein the network establishment response message is to include an SHNAI of the NA, wherein the SHNAI is to identify the NA and indicate that the NA is one hop away from the client computer system, wherein the ME circuitry is to store the SHNAI in a memory of the ME circuitry; and generate the CIRA packet to include the SHNAI of the NA in the SHNAI field and to include a failover capability in the failover capability field, wherein the failover capability is to indicate that the ME circuitry supports provisioning of the application in the client computer device via IDE redirection to the NA.

Example 39 includes the client computer system of example 38 and/or some other example(s) herein, wherein the network establishment request message is a Dynamic Host Configuration Protocol (DHCP) offer message, and the network establishment response message is a DHCP offer message, wherein the DHCP offer message is to include an internet protocol (IP) address to be assigned to the client computer system and the SHNAI of the NA.

Example 40 includes the client computer system of examples 34-41 and/or some other example(s) herein, wherein the processor circuitry is configured to generate the CIRA packet to include client configuration information, wherein the client configuration information is to indicate the application to be provisioned in the client computer system when a fault is detected at the client computer system.

Example 41 includes the client computer system of example 40 and/or some other example(s) herein, wherein the application is an operating system (OS) bootable disk partition or an OS image based on OS information indicated by the client configuration information.

Example 42 includes the client computer system of example 41 and/or some other example(s) herein, wherein, to manage the redirection, the ME circuitry is configured to: receive a first instruction from the RMS over a first end-to-end encrypted tunnel (EET) via the communication circuitry, wherein the first instruction is to instruct the ME circuitry to perform an IDE redirection procedure with the NA to provision the operating system from the remote disk partition; establish, based on the first instruction, a second EET with the NA via the communication circuitry; receive one or more data packets from the NA over the second EET, wherein the one or more data packets comprise data for installation of the operating system at the client computer system; and receive a second instruction from the RMS over the first EET in response to successful installation of the operating system, wherein the second instruction is to instruct the client computer system to load one or more other applications from the remote disk partition via the NA.

Example 43 includes the client computer system of examples 34-42 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 44 includes a method to be performed by a network appliance (NA), the method comprising: receiving, by the NA from a remote management service (RMS), an operating system (OS) bootable disk partition to be provisioned in a managed client computer system when the NA is one hop away from the client computer system; storing, by the NA, the OS bootable disk partition in a local storage of the NA; and permitting, by the NA, the client computer system to boot the OS bootable disk partition from the local storage.

Example 45 includes the method of example 44 and/or some other example(s) herein, further comprising: receiving, by the NA, a network packet from the client computer system; inspecting, by the NA, a header portion of the network packet to identify a client initiated remote access (CIRA) packet within the network packet; inserting, by the NA, a single hop NA identifier (SHNAI) into a NA identifier field of the CIRA packet, wherein the SHNAI is to identify the NA as being one hop away from the client computer system; setting, by the NA, a failover capability field of the CIRA packet to indicate that the NA supports a failover capability of the client computer system via an IDE redirection; and transmitting, by the NA to the RMS, the network packet with the SHNAI in the NA identifier field and the failover capability in the failover capability field.

Example 46 includes the method of example 45 and/or some other example(s) herein, wherein inspecting the header portion comprises inspecting, by the NA, the header portion when the network packet indicates that a destination port of the network packet is an RMS port.

Example 47 includes the method of example 44 and/or some other example(s) herein, further comprising: receiving, by the NA, a first network packet from the RMS, wherein the first network packet is to include a query for an SHNAI of the NA; and generating, by the NA, a second network packet to include the SHNAI of the NA and a failover capability of the NA, wherein the SHNAI is to identify the NA and the SHNAI is to indicate that the NA is one hop away from the client computer system, and wherein the failover capability is to indicate that the NA supports IDE redirection of the client computer device from the local storage; and sending, by the NA, the second network packet to the RMS, wherein the SHNAI and the failover capability in the second network packet are to be packaged into a CIRA packet by the RMS for delivery to the client computer system.

Example 48 includes the method of example 44 and/or some other example(s) herein, further comprising: receiving, by the NA, a network connectivity request message from the client computer system during a network connectivity handshake procedure; assigning, by the NA, an internet protocol (IP) address to the client computer system based on the network connectivity request message; identifying, by the NA, an SHNAI of the NA, wherein the SHNAI is to identify the NA and the SHNAI is to indicate that the NA is one hop away from the client computer system; generate a network connectivity response message to include the assigned IP address and the SHNAI; and transmitting, by the NA, the network connectivity response message to the client computer system, wherein the SHNAI is to be stored in a secure storage of the client computer system.

Example 49 includes the method of example 48 and/or some other example(s) herein, wherein the network connectivity request message is a Dynamic Host Configuration Protocol (DHCP) discovery message and the network connectivity response message is a DHCP offer message, or the network connectivity request message is a DHCP request message and the network connectivity response message is a DHCP acknowledgement message.

Example 50 includes the method of examples 44-49 and/or some other example(s) herein, further comprising: receiving, by the NA from the RMS, one or more additional applications to be provisioned in the client computer system after successful boot of a client OS using the OS bootable disk partition; storing, by the NA, the one or more additional applications in the local storage of the NA; and provisioning, by the NA, the one or more additional applications to the client computer system after the client computer system has successfully booted the client OS using the OS bootable disk partition from the local storage.

Example 51 includes the method of examples 44-50 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 52 includes method to be performed by a remote management service (RMS) for remote management of a client computer system, the method comprising: receiving, by the RMS, a client initiated remote access (CIRA) packet from the client computer system, wherein the CIRA packet is to include a single hop NA identifier (SHNAI), wherein the SHNAI is to identify a network appliance (NA) that is a one hop away from the client computer system; identifying, by the RMS, an operating system (OS) bootable disk partition to be utilized by the client computer system during a system fault or failure; obtaining, by the RMS, the OS bootable disk partition from a storage system; transmitting, by the RMS, the OS bootable disk partition to the NA identified by the SHNAI for storage in a local memory of the NA; and instructing, by the RMS, the client computer system to perform an IDE redirection to the NA to boot a client OS from the local storage of the NA using the OS bootable disk partition.

Example 53 includes the method of example 52 and/or some other example(s) herein, wherein the CIRA packet is to include client configuration information, and the method comprises: inspecting, by the RMS, the client configuration information in the CIRA packet to identify the OS bootable disk partition for the client computer system.

Example 54 includes the method of example 53 and/or some other example(s) herein, further comprising: determining, by the RMS, one or more additional applications to be provisioned in the client computer system boots a client OS using the OS bootable disk partition; obtaining, by the RMS, the one or more additional applications from the storage system; and transmitting, by the RMS, the OS bootable disk partition to the NA for storage in the local memory of the NA, wherein the one or more additional applications are to be provisioned from the local storage of the NA to the client computer system; or provisioning, by the RMS, the one or more additional applications to the client computer system after the client computer system has successfully booted the client OS using the OS bootable disk partition from the local storage.

Example 55 includes the method of example 54 and/or some other example(s) herein, further comprising: receiving, by the RMS, a first indication indicating that the client OS has been successfully booted using the OS bootable disk partition; and transmitting, by the RMS, a second indication to the client computer system to instruct the client computer system to obtain the one or more additional applications from the local storage of the NA; or transmitting, by the RMS, a third indication to the client computer system to instruct the client computer system to obtain the one or more additional applications from one or more locations in the storage system.

Example 56 includes the method of example 53 and/or some other example(s) herein, further comprising: identifying, by the RMS, a first location of the OS bootable disk partition in storage system; and copying, by the RMS, the OS bootable disk partition from the first location to a second location, wherein the second location is in memory circuitry of the NA.

Example 57 includes the method of example 52 and/or some other example(s) herein, wherein instructing the client computer system to perform the IDE redirection comprises: transmitting, by the RMS, a message to the client computer system, wherein the message is to include the instruction to instruct the client computer system to perform the IDE redirection to the NA.

Example 58 includes the method of examples 52-57 and/or some other example(s) herein, further comprising: transmitting, by the RMS, individual query network packets to one or more NAs including the NA, wherein the individual query network packets are to query the one or more NAs for respective SHNAIs; selecting, by the RMS, the NA from among the queried NAs for the IDE redirection; packaging, by the RMS, the SHNAI of the NA into a NA identifier field of a CIRA packet; setting, by the RMS, a failover capability field to indicate that the NA is capable of performing the IDE redirection from a local storage of the NA; and transmitting, by the RMS, the CIRA packet to the client computer system.

Example 59 includes the method of examples 52-58 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 60 includes the method of examples 52-59 and/or some other example(s) herein, wherein the RMS is provided by a computer system employed by a cloud computing service, wherein the NA is an edge gateway device or a fog gateway device that is deployed in a fog computing system, and wherein the client computer system is implemented in an Internet of Things (IoT) device.

Example 61 includes a method to be performed by a client computer system, the method comprising: detecting, by the client computer system, a hardware or software failure of the client computer system; generating, by the client computer system in response to the detecting, a client initiated remote access (CIRA) packet comprising a single hop network appliance identifier (SHNAI) and a failover capability; transmitting, by the client computer system, the generated CIRA packet to a remote management service (RMS); and booting, by the client computer system, a client operating system (OS) using an OS bootable disk partition from a local storage of a network appliance (NA) associated with the SHNAI.

Example 62 includes the method of example 61 and/or some other example(s) herein, further comprising: transmitting, by the client computer system, a first network packet to the NA, wherein a header portion of the first network packet is to include the generated CIRA packet; and receiving, by the client computer system, a second network packet from the NA, wherein the second network packet is to include an updated CIRA packet, wherein the updated CIRA packet is to include the SHNAI of the NA in an SHNAI field of the CIRA packet and the failover capability in a failover capability field of the CIRA packet, wherein the SHNAI is to identify the NA and indicate that the NA is a single hop from the client computer system, and wherein the failover capability is to indicate that the NA supports IDE redirection of the client computer system for booting from the local storage of the NA, and the failover capability is to indicate that the client computer system supports IDE redirection of the client computer system for provisioning from a remote disk partition.

Example 63 includes the method of example 62 and/or some other example(s) herein, wherein a destination port in the first network packet is to indicate an RMS port.

Example 64 includes the method of example 61 and/or some other example(s) herein, further comprising: transmitting, by the client computer system, a first network packet to the NA, wherein a body portion of the first network packet is to include a query for an SHNAI of the NA; and receiving, by the client computer system, a second network packet from the NA, wherein the second network packet is to include the SHNAI of the NA; and generating, by the client computer device, the CIRA packet to include the SHNAI of the NA in an SHNAI field and the failover capability in a failover capability field, wherein the SHNAI is to identify the NA and indicate that the NA is one hop away from the client computer system, and wherein the failover capability is to indicate that the ME circuitry supports provisioning of the application in the client computer device via IDE redirection to the NA.

Example 65 includes the method of example 61 and/or some other example(s) herein, further comprising: establishing, by the client computer system, a network connection with the NA, and establishing the network connection with the NA comprises: transmitting, by the client computer system, a network establishment request message to the NA; receiving, by the client computer system, a network establishment response message from the NA, wherein the network establishment response message is to include the SHNAI of the NA, wherein the SHNAI is to identify the NA and indicate that the NA is one hop away from the client computer system, storing, by the client computer device, the SHNAI in a secure storage in the client computer device;

and generating, by the client computer device, the CIRA packet to include the SHNAI of the NA in the SHNAI field and to include a failover capability in the failover capability field, wherein the failover capability is to indicate that the client computer device supports IDE redirection to the NA.

Example 66 includes the method of example 65 and/or some other example(s) herein, wherein the network establishment request message is a Dynamic Host Configuration Protocol (DHCP) offer message, and the network establishment response message is a DHCP offer message, wherein the DHCP offer message is to include an internet protocol (IP) address to be assigned to the client computer system and the SHNAI of the NA.

Example 67 includes the method of examples 61-66 and/or some other example(s) herein, further comprising: generating, by the client computer system, the CIRA packet to include client configuration information, wherein the client configuration information is to indicate the application to be provisioned in the client computer system when a fault is detected at the client computer system.

Example 68 includes the method of examples 61-67 and/or some other example(s) herein, further comprising: transmitting, by the client computer system to the RMS, a first indication indicating that the client OS has been successfully booted using the OS bootable disk partition in the local storage of the NA; and receiving, by the client computer system from the RMS, a second indication instructing the client computer system to obtain one or more additional applications from the local storage of the NA; or receiving, by the client computer system from the RMS, a third indication instructing the client computer system to obtain the one or more additional applications from one or more locations in a network storage system, wherein the network storage system is a network attached storage (NAS) storage or a cloud hosted storage system.

Example 69 includes the method of example 68 and/or some other example(s) herein, further comprising: receiving, by the client computer system from the RMS over a first end-to-end encrypted tunnel (EET), a first instruction to instruct management engine circuitry of the client computer system to perform an IDE redirection procedure with the NA to perform the booting; establishing, by the client computer system based on the first instruction, a second EET with the NA; receiving, by the client computer system, one or more data packets from the NA over the second EET, wherein the one or more data packets comprise data for booting the client OS; and receiving, by the client computer system from the RMS over the first EET, a second instruction in response to successful installation of the client OS, wherein the second instruction is to instruct the client computer system to load one or more other applications from the local storage of the NA or from the network storage system.

Example 70 includes the method of examples 61-69 and/or some other example(s) herein, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

Example 71 may include an apparatus comprising means to perform one or more elements of a method described in or related to any of examples 1-70, or any other method or process described herein.

Example 72 may include one or more non-transitory computer-readable media comprising instructions to cause an electronic device, upon execution of the instructions by one or more processors of the electronic device, to perform one or more elements of a method described in or related to any of examples 1-70, or any other method or process described herein.

Example 73 may include an apparatus comprising logic, modules, or circuitry to perform one or more elements of a method described in or related to any of examples 1-70, or any other method or process described herein.

Example 74 may include a method, technique, or process as described in or related to any of examples 1-70, or portions or parts thereof.

Example 75 may include an apparatus comprising: one or more processors and one or more computer readable media comprising instructions that, when executed by the one or more processors, cause the one or more processors to perform the method, techniques, or process as described in or related to any of examples 1-70, or portions thereof.

Example 76 may include a signal as described in or related to any of examples 1-70, or portions or parts thereof.

Example 77 may include a signal in a wireless network as shown and described herein.

Example 78 may include a method of communicating in a wireless network as shown and described herein.

Example 79 may include a system for providing wireless communication as shown and described herein.

Example 80 may include a device for providing wireless communication as shown and described herein.

Various embodiments and examples discussed previously may include any suitable combination of the above-described embodiments and/or examples including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

As will be appreciated by one skilled in the art, aspects of the present disclosure may be embodied as methods or computer program products. Accordingly, aspects of the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system." Furthermore, aspects of the present disclosure may take the form of a computer program product embodied in any tangible or non-transitory medium of expression having computer-usable program code embodied in the medium.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. An apparatus to be employed as a network appliance (NA), the apparatus comprising:

network interface circuitry (NIC) arranged to receive, from a remote management service (RMS), an IDE redirection message for a client computer system when the NA is one hop away from the client computer system, the IDE redirection message indicates an application to be provisioned in the client computer system; and processor circuitry communicatively coupled with memory circuitry and the NIC, the processor circuitry arranged to:
control storage of the application indicated by the IDE redirection message in the memory circuitry, and
control provisioning of the application from the memory circuitry to the client computer system based on a provisioning instruction obtained from the RMS.

2. The apparatus of claim 1, wherein:
the NIC is arranged to receive a network packet from the client computer system, and send an updated version of the network packet to the RMS; and
the processor circuitry is arranged to:
inspect a header portion of the network packet to identify a client initiated remote access (CIRA) packet within the network packet,
set a failover capability field of the CIRA packet to indicate that the NA supports provisioning of the application via IDE redirection, and
insert a single hop NA identifier (SHNAI) into the CIRA packet to obtain the updated version of the network packet, wherein the SHNAI is to identify the NA as being one hop away from the client computer system.

3. The apparatus of claim 2, wherein the processor circuitry is arranged to inspect the header portion when the network packet indicates that a destination port of the network packet is an RMS port.

4. The apparatus of claim 1, wherein:
the NIC is arranged to receive a first network packet from the RMS, wherein the first network packet includes a query for an SHNAI of the NA, and send a second network packet to the RMS; and
the processor circuitry is arranged to generate the second network packet to include the SHNAI of the NA and a failover capability of the NA, wherein the SHNAI is to identify the NA and the SHNAI is to indicate that the NA is one hop away from the client computer system, and wherein the failover capability is to indicate that the NA supports provisioning of the application in the client computer system via IDE redirection.

5. The apparatus of claim 1, wherein:
the NIC is arranged to receive a Dynamic Host Configuration Protocol (DHCP) discovery message from the client computer system during a DHCP connectivity handshake procedure, and send a DHCP offer message to the client computer system in response to the DHCP offer message; and
the processor circuitry is arranged to generate the DHCP offer message to include an internet protocol (IP) address to be assigned to the client computer system and an SHNAI of the NA, wherein the SHNAI is to identify the NA and the SHNAI is to indicate that the NA is one hop away from the client computer system.

6. The apparatus of claim 1, wherein the application is an operating system of the client computer system.

7. The apparatus of claim 2, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

8. The apparatus of claim 1, wherein the NA is a gateway device comprising a plurality of gateway functions, wherein the plurality of gateway functions comprise one gateway function to be operated by the processor circuitry to control the storage of the application indicated by the IDE redirection message in the memory circuitry and control the provisioning of the application from the memory circuitry to the client computer system based on a provisioning instruction obtained from the RMS.

9. One or more non-transitory computer-readable media (NTCRM) comprising instructions, wherein execution of the instructions by one or more processors of a remote management service (RMS) computer system is to cause the RMS computer system to:
control receipt of a client initiated remote access (CIRA) packet from a client computer system that is managed by the RMS, wherein the CIRA packet is to include a single hop NA identifier (SHNAI), and wherein the SHNAI is to identify a network appliance (NA) that is one hop away from the client computer system;
identify an application to be provisioned in the client computer system;
control transmission of the application to the NA identified by the SHNAI for storage by the NA; and
instruct the NA to provision the application in the client computer system.

10. The one or more NTCRM of claim 9, wherein the CIRA packet is to include client configuration information, and wherein execution of the instructions is to cause the RMS computer system to:
inspect the client configuration information in the CIRA packet to identify the application to be provisioned in the client computer system.

11. The one or more NTCRM of claim 10, wherein the application is an operating system (OS) bootable disk partition or OS image based on OS information indicated by the client configuration information.

12. The one or more NTCRM of claim 10, wherein execution of the instructions is to cause the RMS computer system to:
identify a first location of the application in a network attached storage (NAS) system; and
copy the application from the first location to a second location, wherein the second location is in a local storage of the NA.

13. The one or more NTCRM of claim 9, wherein, to instruct the NA to provision the application in the client computer system, execution of the instructions is to cause the RMS computer system to:
control transmission of a message to the client computer system, wherein the message is to include another instruction to instruct the client computer system to perform an IDE redirection to the NA.

14. The one or more NTCRM of claim 9, wherein execution of the instructions is to cause the RMS computer system to:
control receipt of a first indication to indicate that the application has been successfully provisioned in the client computer system;
to generate a second indication in response to receipt of the first indication, wherein the second indication is to instruct the client computer system to load one or more other applications upon provisioning of the application; and control transmission of the second indication to the client computer system.

15. The one or more NTCRM of claim 9, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

16. The one or more NTCRM of claim 9, wherein the RMS computer system is employed by a cloud computing service, wherein the NA is an edge gateway device or a fog gateway device that is deployed in a fog computing system, and wherein the client computer system is implemented in an Internet of Thigs (IoT) device.

17. A system comprising:
a remote management service (RMS);
a single hop network appliance (NA); and
one or more managed client computer systems, wherein:
the RMS is configurable to identify an application to be provisioned in a client computer system based on a received client initiated remote access (CIRA) packet, provide the application to the single hop NA for storage by the single hop NA;
the single hop NA is configurable to obtain the application from the RMS, store the application in a local storage of the single hop NA, and provision the application in a faulty client computer system of the one or more managed client computer systems; and
the faulty client computer system is configurable to detect a hardware or software fault; generate, in response to the detection, the CIRA packet to include a single hop NA identifier (SHNAI) field to include an SHNAI of the single hop NA and a failover capability field to include a failover capability of the faulty client computer system, transmit the generated CIRA packet to the RMS; and receive one or more data packets from the single hop NA for provisioning an application from the local storage of the single hop NA.

18. The system of claim 17, wherein the faulty client computer system is configurable to:
transmit a first network packet to the NA, wherein a header portion of the first network packet is to include the generated CIRA packet; and
receive a second network packet from the NA, wherein the second network packet is to include an updated CIRA packet, wherein the updated CIRA packet is to include a SHNAI of the NA in the SHNAI field and a failover capability in the failover capability field,
wherein the SHNAI is to identify the NA and indicate that the NA is a single hop from the client computer system, and
wherein the failover capability is to indicate that the NA supports redirection of the client computer system for provisioning from a local storage of the NA, and the failover capability is to indicate that the client computer system supports redirection of the client computer system for provisioning from the local storage of the NA.

19. The system of claim 18, wherein a destination port in the first network packet is to indicate an RMS port.

20. The system of claim 17, wherein the faulty client computer system is configurable to:

transmit a first network packet to the NA, wherein a body portion of the first network packet is to include a query for an SHNAI of the NA;

generate the CIRA packet to include the SHNAI of the NA in the SHNAI field and a failover capability in the failover capability field, wherein the SHNAI is to identify the NA and indicate that the NA is one hop away from the client computer system, and wherein the failover capability is to indicate that the client computer system supports provisioning of the application in the client computer system via IDE redirection to the NA; and receive a second network packet from the NA, wherein the second network packet is to include the SHNAI of the NA.

21. The system of claim 17, wherein the faulty client computer system is configurable to establish a network connection with the NA, and wherein, to establish the network connection with the NA, the faulty client computer system is configurable to:
transmit a network establishment request message to the single hop NA;
receive a network establishment response message from the single hop NA, wherein the network establishment response message is to include an SHNAI of the single hop NA, wherein the SHNAI is to identify the single hop NA and indicate that the single hop NA is one hop away from the faulty client computer system;
store the SHNAI in a secure storage of the faulty client computer system; and
generate the CIRA packet to include the SHNAI of the NA in the SHNAI field and to include a failover capability in the failover capability field, wherein the failover capability is to indicate that the faulty client computer system supports provisioning of the application in the client computer system via IDE redirection to the NA.

22. The system of claim 21, wherein the network establishment request message is a Dynamic Host Configuration Protocol (DHCP) discovery message or a DHCP request message, and the network establishment response message is a DHCP offer message when the network establishment request message is the DHCP discovery message or the network establishment response message is a DHCP acknowledgement message when the network establishment request message is the DHCP request message, wherein the DHCP offer message or the DHCP acknowledgement message is to include an internet protocol (IP) address to be assigned to the client computer system and the SHNAI of the single hop NA.

23. The system of claim 17, wherein the faulty client computer system is configurable to generate the CIRA packet to include client configuration information of the faulty client computer system, wherein the client configuration information is to indicate the application to be provisioned in the faulty client computer system when a fault is detected at the faulty client computer system.

24. The system of claim 23, wherein the application is an operating system (OS) bootable disk partition or OS image based on OS information indicated by the client configuration information.

25. The system of claim 24, wherein the faulty client computer system comprises management engine (ME) circuitry to manage redirection, wherein the ME circuitry is configurable to:
receive a first instruction from the RMS over a first end-to-end encrypted tunnel (EET) via communication circuitry of the faulty client computer system, wherein the first instruction is to instruct the ME circuitry to perform an IDE redirection procedure with the NA to provision the operating system from a remote disk partition;

establish, based on the first instruction, a second EET with the NA via the communication circuitry;

receive one or more data packets from the NA over the second EET, wherein the one or more data packets comprise data for installation of the operating system at the client computer system; and receive a second instruction from the RMS over the first EET in response to successful installation of the operating system, wherein the second instruction is to instruct the client computer system to load one or more other applications from the remote disk partition via the NA.

26. The system of claim 17, wherein the SHNAI comprises an internet protocol (IP) address, a port number, an Intel® Active Management Technology (AMT)® port number, a media access control (MAC) address, a domain name assigned to the NA, a unique device identification (UDI), a uniform resource locator (URL) of the NA, or a Mobile Station International Subscriber Directory Number (MSISDN).

* * * * *

UNITED STATES PATENT AND TRADEMARK OFFICE
CERTIFICATE OF CORRECTION

PATENT NO. : 10,819,566 B2
APPLICATION NO. : 16/020540
DATED : October 27, 2020
INVENTOR(S) : Yen Hsiang Chew Page 1 of 1

It is certified that error appears in the above-identified patent and that said Letters Patent is hereby corrected as shown below:

In the Claims

Column 57
Line 19, "...Thigs..." should read – "...Things..."

Signed and Sealed this
Twenty-second Day of December, 2020

Andrei Iancu
*Director of the United States Patent and Trademark Office*